United States Patent Office 3,531,504
Patented Sept. 29, 1970

3,531,504
PROCESS FOR THE PREPARATION OF CYCLIC KETONES AND CYCLIC ALDEHYDES AND PRODUCTS PRODUCED THEREBY
Jean-Marie Conia, Caen, France, assignor, by mesne assignments, to Schering Corporation, Bloomfield, N.J., a corporation of New Jersey
No Drawing. Continuation-in-part of application Ser. No. 536,078, July 6, 1966. This application May 31, 1967, Ser. No. 642,352
Claims priority, application France, July 13, 1965, 24,548; Nov. 4, 1966, 82,589, 82,590; Feb. 21, 1967, 95,867
Int. Cl. C07c 167/04
U.S. Cl. 260—397.4          19 Claims

ABSTRACT OF THE DISCLOSURE

Described herein is a novel thermocyclization process for the preparation of carbonyl substituted alicyclic compounds from straight chain and branched chain ketones and aldehydes, a process useful in the construction of polycyclic molecules, particularly steroids, many of which are known, useful compounds.

The process described comprises heating at elevated temperatures an unsaturated aliphatic ketone or aldehyde having a straight chain moiety of at least seven carbon atoms wherein there is an unsaturated bond at one end and a carbonyl function at the other end (or a carbonyl derivative thereof) and a hydrogen on the carbon alpha to the carbonyl function whereby is formed an alicyclic compound having an alkyl substituent and a vicinal carbonyl substituent, wherein the alicyclic ring has two carbons less than were in the straight chain moiety of the starting ketone or aldehyde.

Examples illustrating the process include those describing the thermocyclization of simple alkenones, alkinones, alkenals and alkinals as well as of polycyclic ketone and aldehyde structures such as those in steroid molecules. Also included are examples illustrating the thermocyclization of ketone and aldehyde derivatives of the foregoing whereby are obtained the same vicinally substituted alicyclic compounds as are derived from the thermocyclization of the corresponding free ketones or aldehydes.

CROSS REFERENCE TO RELATED APPLICATIONS

This application is a continuation-in-part of copending application Ser. No. 536,078 of Jean M. Conia filed July 6, 1966, now abandoned.

BACKGROUND OF THE INVENTION

This invention relates to a process for the preparation of carbonyl substituted alicyclic compounds from straight chain and branched chain ketones and aldehydes and to the products produced thereby.

The process of this invention is useful in forming carbonyl substituted cycloalkanes and cycloalkenes from simple alkenones, alkinones, alkenals and alkinals. This process is also useful in the construction of polycyclic molecules and particularly of steroid polycyclic molecules, some of which are new and many of which are known, and which are useful compounds having valuable pharmacological and other properties as set forth hereinbelow.

SUMMARY OF THE INVENTION

The invention sought to be patented is described as residing in the concept of a thermocyclization process which comprises heating at elevated temperatures an unsaturated aliphatic carbonyl compound having a moiety comprising at least seven carbon atoms in a straight chain wherein there is an unsaturated bond between the first and second carbon atoms at one end of said straight chain, and the carbonyl function includes the last carbon at the other end of said straight chain, and wherein there is at least one hydrogen on the carbon alpha to said carbonyl fuction; whereby said hydrogen transfers to said first carbon atom and said alpha carbon becomes bonded to said second carbon, and there is formed an alicyclic compound having an alkyl substituent on said second carbon atom and a vicinal-carbonyl substituent, the alicyclic ring having two carbons less than said straight chain moiety in said unsaturated aliphatic carbonyl compound; and, when the unsaturated bond between the first and second carbons of said starting aliphatic carbonyl compound is a triple bond, said vicinally substituted alicyclic compound also possessing a double bond stemming from said second carbon atom.

As used in this application and in the claims, the term "carbonyl substituent" includes both aldehydes and ketones and, by "vicinal carbonyl substituent" is meant a carbonyl substituent bonded to a carbon in the alicyclic ring which is adjacent the alicyclic carbon bearing the alkyl group. By "alicyclic" is included saturated and unsaturated hydrocarbon ring compounds having aliphatic properties. By my process, therefore, upon thermocyclization of an alkenone there is formed a 1-alkylcycloalkane having a 2-carbonyl derivative; and upon thermocyclization of an alkinone there is formed a 1-alkylcycloalkane having a 2-carbonyl derivative and also having a double bond stemming from C-1, i.e. from the cyclic carbon atom bonded to said alkyl derivative.

Contemplated as within the scope of this invention, and as being the equivalent of the process as disclosed and claimed herein is the concept of heating a ketone or aldehyde derivative of a hereinabove defined unsaturated aliphatic carbonyl compound to obtain an alicyclic compound having an alkyl substituent and a vicinal carbonyl substituent.

Among the functional ketone derivatives contemplated as equivalents to the free ketones as starting compounds for my process are ketone derivatives such as dialkyl ketals (e.g. dimethyl- and diethyl-ketals of 7-octen-2-one), cyclic ketals (e.g. ethylene ketal of 7-octen-2-one), enol esters (e.g. the enol acetate of 7-octen-2-one), enol ethers (e.g. the ethyl enol ether of 7-octen-2-one). When any of the above named ketone derivatives of 7-octen-2-one are heated according to my process, there is obtained 1-acetyl-2-methyl-cyclopentane, the same product derived from the thermocyclization of 7-octen-2-one per se.

Similarly, aldehyde derivatives contemplated as equivalents to the free aldehydes as starting compounds for my process are such as dialkyl acetals (e.g. diethyl acetal of 2-methyl-6-heptenal), enol esters (e.g. the enol acetate of 6-heptenal), and enol ethers (e.g. the ethyl enol ether of 6-heptenal). When any of the aforenamed aldehyde derivatives are heated according to my process, there is obtained the corresponding 1-formyl-2-methyl-cyclopentane, i.e. the same product derived from the thermocyclization of the aldehyde per se.

GENERAL DESCRIPTION OF THE INVENTION

The temperatures contemplated for carrying out the process of this invention are in the range of from about 200° C. to about 450° C., and preferably in the range of from about 275° C. to 425° C. for the thermocyclization of an alkenone, and preferably in the range of from 250° C. to about 300° C. for the thermocyclization of an alkinone.

The aldehydes thermocyclize at temperatures lower than those at which the ketones cyclize, thus the alkenals are thermocyclized preferably in the range of from about 225° C. to 375° C., and usually from about 300° C. to about 350° C., an optimum reaction temperature for alkenols being about 320° C.; and the alkinals are thermocyclized preferably in the range of from about 200° C. to about 250° C. Usually, in carrying out my process, an alkenal is conveniently thermocyclized at temperatures about 30° to 50° C. lower than those which a corresponding alkenone (based upon total number of carbon atoms) is thermocyclized. For example, 7-octen-2-one (compound A1) heated at 370° for 30 minutes yields about 95% yield of 1-acetyl-2-methylcyclopentane (compounds $B_1$ and $B'_1$) whereas 2-methyl-6-heptenal (compound $A_{30}$) heated at 320° C. for one hour yields about 80% of 1-formyl-1,2-dimethylcyclopentane (compound $B_{30}$).

The cyclization process of this invention usually takes place stereospecifically and in high yields, quantitative yields being obtained in those cases wherein starting alkenone, alkinone, alkenal or alkinal is devoid of groups extremely sensitive to high temperatures. When utilizing an aldehyde or derivative thereof as starting compound, however, it is necessary that the aldehyde be in a pure state in order to obtain these high yields. The time necessary to effect cyclization according to my process is usually short, from about thirty minutes to about an hour, although additional heating time is necessary in more complex molecules, particularly those containing sterically hindered groups.

In brief, represented below is the concept of the thermocyclization process of this invention when the starting unsaturated aliphatic carbonyl compound is one possessing a double bond between C–1 and C–2, i.e. is an alkenone ($R_7$ is alkyl) or an alkenal ($R_7$ is hydrogen). In the following diagram, Formula I represents a starting alkenone or alkenal, and Formula II represents an alicyclic compound having vicinal alkyl and carbonyl substituents, e.g. in this species, a 1-alkylcycloalkane having a 2-carbonyl derivative:

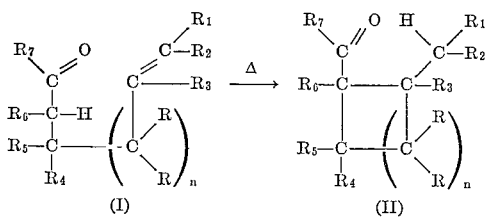

wherein

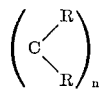

is a straight chain hydrocarbon radical wherein $n$ is at least 2 (and preferably is 2 or 3) and which may be saturated or unsaturated, and wherein R, $R_1$, $R_2$, $R_3$, $R_4$, $R_5$, $R_6$, and $R_7$ are members selected from the group consisting of hydrogen and a hydrocarbon radical.

Contemplated as within the term hydrocarbon radical are saturated and unsaturated hydrocarbon radicals which may be straight or branch chain, or cyclic, and including radicals of the alkyl, aryl, alkaryl and aralkyl series which may be substituted and which may be a part of other ring structures. Contemplated as within the term "hydrocarbon radical," therefore, are straight and branch chain alkyl radicals such as methyl, ethyl, n-propyl, isopropyl, n-butyl, iso-butyl, tertiary butyl, n-pentyl, n-hexyl, n-heptyl, n-octyl; aryl radicals such as phenyl, naphthyl, anthracyl; alkaryl radicals such as benzyl, phenethyl; aralkyl such as tolyl, α-methylnaphthyl and the like. The hydrocarbon radicals such as R, $R_1$ thru $R_7$ may also be a part of other ring systems such as in a seco steroid.

Also contemplated within the term "hydrocarbon radicals" as used in this application are substituted hydrocarbon radicals, e.g. such as by halogen, including possessing functional substituents as exemplified by carboalkoxy derivatives such as carbomethoxy and carboethoxy. Thus, with reference to above Formulae I and II, in the thermocyclization of 3-carboethoxy-7-octen-2-one (ketone $A_3$, Example 3) to 1-carboethoxy-2-methyl-1-acetylcyclopentane (ketone $B_3$) according to my process, the starting alkenone $A_3$ has a carboethoxy radical as the "hydrocarbon radical", $R_6$. Similarly, the thermocyclization of cis- and trans-9-carbomethoxy-7-nonene-2-one (ketone $A_{32}$ and $A'_{32}$, respectively of Example 32) to 1-acetyl-2-carbomethoxymethylcyclopentane (i.e. methyl) (2-acetylcyclopentyl) acetate (ketone $B_{32}$ illustrates the thermocyclization of a ketone of Formula I wherein $R_1$ and $R_2$, respectively, are carbomethoxy.

As disclosed hereinabove, contemplated as equivalents to the starting alkenone or alkenal, I, shown above, are ketone and aldehyde derivatives thereof including di-lower alkyl ketals and acetals, cyclic ketals and acetals (e.g. ethylene ketal and ethylene acetal), enol ethers, and enol esters thereof. I have discovered, for example, that when a ketone derivative of an alkenone of Formula I, (e.g. the dimethyl or diethyl ketal, or the ethylene ketal, or the enol methyl ether, or the enol acetate ester of 7-octen-2-one) are heated according to my process at temperatures in the range of from about 200° C. to about 450° C., there is formed the same cyclic ketone (e.g. 1-acetyl-2-methyl-cyclopentane) as obtained by heating the free ketone per se (e.g. 7- octen-2-one). I have further discovered that when a ketone derivative of an alkenone of Formula I is heated at elevated temperatures, there is first formed the free acyclic ketone in situ (as evidenced by the disclosure of Examples 22–28) which then cyclizes to form a 1-alkylcycloalkane having a 2-carbonyl function, i.e. a compound of Formula II. It is, therefore, apparent that ketone derivatives of the alkenones of Formula I are equivalent to the alkenones per se as starting compounds for my process since, under the conditions of my process, the carbonyl derivatives are first converted to the free aliphatic carbonyl compound prior to cyclization thereof.

When utilizing a carbonyl derivative of an alkenone or alkenal (I) as a starting material for my process, the thermocyclization thereof can usually be effected at about the same or lower temperature and within about the same period of time as that required for the thermocyclization of the corresponding free carbonyl compound, I. At lower temperatures, long periods of heating are usually required (both with an alkenone or alkenal I per se or with a derivative thereof) to effect complete conversion to the carbonyl-substituted alicyclic compound. Thus, for example, when one heats 7-octen-2-one at 370° C. for 30 minutes, there is obtanied 1-acetyl-2-methyl-cyclopentane. At 330° C. heating is continued for two hours, while at 280° C. heating is continued for 40 hours to obtain substantial yields of 1-acetyl-2-methylcyclopentane.

Similarly, when one heats the diethyl ketal of 7-octen-2-one (i.e. compound $A_{22}$ of Example 22) for one hour at 340° C. there is also obtained 1-acetyl-2-methylcyclopentane, whereas when the aforementioned diethyl ketal is heated at a lower temperature, i.e. 300° C. for one hour, there is obtained a mixture of the enol ether derivative (i.e. 2 - methoxy - 2,7 - octadiene) and the unsubstituted ketone (7-octen-2-one). Continued heating for another hour at the lower temperature at 300° C., will then yield the desired 1-acetyl-2-methylcyclopentane in admixture with some of the free acyclic ketone precursor.

I have also found that when thermocyclizing by my process, derivatives of alkenones, and particularly certain ketals such as ethylene ketals, the yield of the carbonyl substituted alicyclic compound thereby formed can be greatly increased by adding water to the starting derivative, prior to heating in a sealed ampule. When a ketal is being cyclized, water can be added in amounts up to about a 50:50 mixture of water and ketal.

The concept of the thermocyclization process of this invention when the starting unsaturated aliphatic carbonyl compound is one possessing a triple bond between C–1 and C-2, i.e. is an alkinone, ($R_7$ is alkyl) or an alkinal ($R_7$ is hydrogen) is illustrated by the following flow diagram wherein Formula I' represents a starting alkinone or alkinal, and Formulae III and IV represent the alicyclic compound formed when substituents $R_6$ and/or R on the carbon adjoining the alkinyl moiety are hydrogen. Formula V represents the exocyclic 1-alkylidenecycloalkane ketone or aldehyde formed when both $R_6$ and the R on the carbon adjoining the alkinyl moiety are hydrocarbon radicals and, thus, there are no hydrogen atoms available to migrate to the external carbon on the ethynyl group.

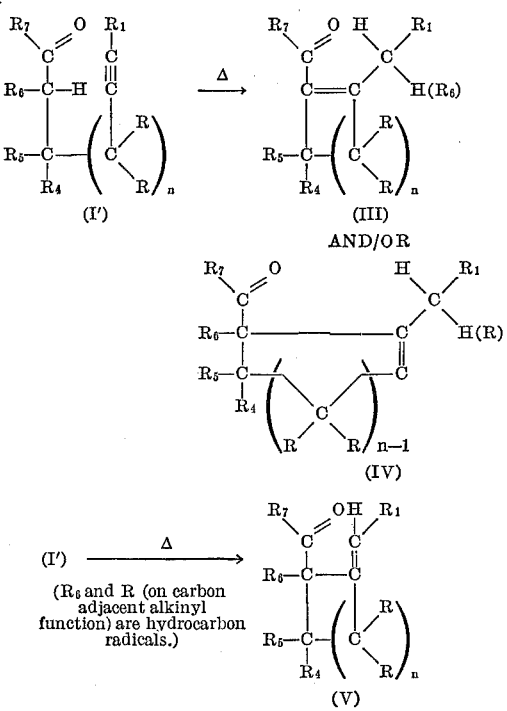

Under the conditions of my process, upon thermocyclization of an alkinone or alkinal, I', wherein both $R_6$ and R are hydrogen, there is formed a mixture of the ring unsaturated alicyclic compounds III and IV, whereas, if one of $R_6$ or R is a hydrocarbon radical only one of the cyclic ketones III or IV will be formed. When both $R_6$ and R in the starting alkinone or alkinal, I', are hydrocarbon radicals, only the exocyclic alicyclic carbonyl compound, V, will be produced. Thus, when 7-octyn-2-one (wherein $R_6$ and R are hydrogen) is heated in a sealed Pyrex tube at 300° C. for one hour there is formed a mixture of 1-acetyl-2-methyl-1-cyclopentene and 1-acetyl-2-methyl-2-cyclopentene. Thermocyclization of 6-benzoyl-1-heptyne (wherein $R_6$ is methyl and R is hydrogen) at 260° C. for one hour yields only one unsaturated cyclic ketone, i.e. 1-benzoyl-1,2-dimethyl-2-cyclopentene, a compound of Formula IV.

In their broadest sense, the terms "alkenone," "alkenal," "alkinone" and "alkinal" utilized to define the unsaturated aliphatic carbonyl starting compounds of the process of this invention are contemplated as including any organic carbonyl compound or equivalent thereof wherein there is present a moiety having at least 7 (and preferably 7 or 8) carbons bonded to each other in a straight chain relationship and having a double bond or a triple bond, respectively, at one end of the chain and an α-methylidene-carbonyl function (i.e. —ĊH—CO—)

at the other end of said chain. According to the process of this invention, when such an alkenone, alkenal, alkinone or alkinal is heated at elevated temperatures, i.e. within the range of from about 250° C. to about 450° C., the hydrogen of the α-methylidene group transfers to the first carbon atom of the unsaturation present at the other end of said chain and the carbon of the α-methylidene group becomes bonded to the second carbon atom, and there is formed a methylcycloalkane of Formula II having a vacinal carbonyl derivative, or, in the case of an alkinone or alkinal of Formula I', a methylcycloalkene having a double bond stemming from C-2 as defined by Formulae III and/or IV, or of Formula V.

DESCRIPTION OF THE PREFERRED EMBODIMENTS

Preferably, the process of this invention is carried out on alkenones wherein n is 2 or 3, and wherein $R_1$, $R_2$, $R_3$ and $R_6$ are hydrogen or methyl, and wherein $R_7$ is methyl, i.e. alkenones wherein there is a vinyl (or a methyl-substituted vinyl) group at one end of the straight chain and an acetylmethylene ($CH_3COCH_2$—) (or an acetyl methyl)methine

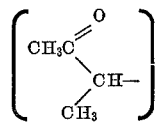

group at the other end of said chain, which when heated at elevated temperatures according to my process produces a 1-acetyl-2-methyl-cyclopentane (when n is 2 and $R_1=R_2=R_3=R_6=H$) and a 1-acetyl-2-methylcyclohexane (when n is 3 and $R_1=R_2=R_3=R_6=H$), respectively, wherein the moieties R, $R_4$ and $R_5$ (with reference to Formula I) can be hydrogen or a hydrocarbon radical, including substituted hydrocarbon radicals and hydrocarbon radicals which are a part of other ring systems such as in the steroid molecule. When any of $R_1$, $R_2$, $R_3$ and $R_6$ are methyl, methyl derivatives of the foregoing are obtained; specifically, e.g. when $R_6$ is methyl and $R_1=R_2=R_3=H$, there are obtained a 1,2-dimethyl-1-acetylcyclopentane (when n is 2) and a 1,2-dimethyl-1-acetyl-cyclohexane (when n is 3) wherein the moieties R, $R_4$ and $R_5$ (with reference to Formula I) can be hydrogen or a hydrocarbon radical, including substituted hydrocarbon radicals as well as hydrocarbon radicals which are a part of other ring systems such as in the steroid molecule.

In the preferred embodiment of my process, the substituents $R_1$, $R_2$ and $R_6$ may also be a carboalkoxy radical (e.g. carbomethoxy and carboethoxy) whereby are obtained cycloalkane derivatives possessing the corresponding carboalkoxy substituents. Thus, 3-carboethoxy-7-octen-2-one (wherein $R_6$ is carboethoxy) when heated at elevated temperatures by my process yields 1-carboethoxy-1-acetyl-2-methyl-cyclopentane.

By way of illustration, my process is described below utilizing 7-octen-2-one and 8-nonen-2-one as starting ketones, i.e. alkenones wherein n is 2 and 3, respectively and wherein R, $R_1$, $R_2$, $R_3$, $R_4$, $R_5$ and $R_6$ are hydrogen and $R_7$ is methyl. When either 7-octen-2-one ($A_1$) or 8-nonen-2-one ($A_9$) is heated for one-half hour at 330° C. there is obtained 2-methyl-1-acetyl-cyclopentane ($B_1$, $B_1'$) or 2-methyl-1-acetylcyclohexane ($B_9$), respectively.

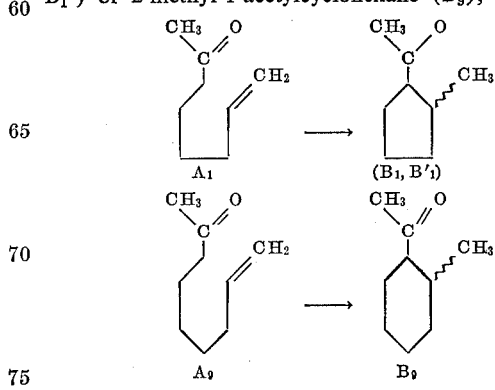

The above illustrates my process whereby simple alkenones are heated to form simple cycloalkane compounds. As disclosed hereinabove, the carbon atoms forming part of the hydrocarbon straight chain of the starting alkenone may be part of other ring systems. Thus, 1-acetyl - 2 - methyl - 3-[′(1′-propenyl)]-cyclohexane (ketone $A_{11}$ in Example 11) shown below is an alkenone starting compound of my process wherein the 1-acetyl substituent and the 1, 2, and 3 carbons of the cyclohexane ring together with the

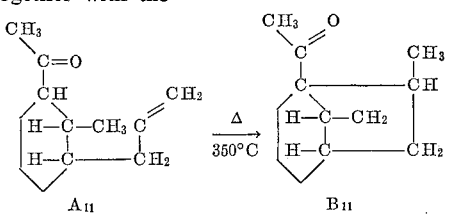

3-propenyl substituent form the requisite hydrocarbon straight chain of Formula I and is an alkenone wherein $n$ is 2, $R_1$, $R_2$, $R_3$, $R_4$ and three of the "R" groups are hydrogen; $R_5$ and $R_7$ are methyl; and $R_6$ and one of the "R" groups are methylene and are bonded to other carbon atoms of the cyclohexane ring. When above ketone $A_{11}$ is heated at 350° C. according to my process, there is obtained a polycyclic ketone $B_{11}$, namely 1-acetyl-7,8-dimethyl-bicyclo[3.2.1]octane, which is characterized by specific olfactive properties making it useful in the perfume industry. Other bicyclic compounds prepared by the process of my invention which are useful in the manufacture of perfumes, e.g. as fixatives, are those described in Examples 12–15, 26 and 31, namely, 1-acetyl-2,7-dimethyl-bicyclo[2.2.1]heptane, 3,9-dimethyl - 4 - hexahydroindanone, 3-methyl - 4 - hexahydroindanone, 1-methyl-spiro[4.5]decan - 6 - one, 3-acetyl-9-methyl-hexahydroindane and 1-methyl-1a-formylhydrindane, respectively.

My process is particularly useful as a building block in the preparation of cyclic and bicyclic ketones and aldehydes heretofore difficult or impossible to make. For example, heretofore unknown 1-acetyl-2-methyl-cyclononane is easily prepared by my process by heating 11-dodecen-2-one at 385° for about thirty minutes. In addition to being useful as intermdiates in the preparation of novel structures, large cyclic ketones such as 1-acetyl-2-methylcyclononane possess olfactive properties of use in the manufacture of perfume.

My process finds one of its most valuable uses in the manufacture of steroid derivatives from other polycyclic compounds having fewer ring systems than the desired steroid by forming the desired added ring system, e.g. the D-ring. Thus for example, 3-methoxy-17-methylene-13,17-seco-1,3,5(10)-estratrien-12-one (ketone $A_{18}$—prepared as described in Example 18A) when heated at 350° C. undergoes cyclization according to my process and there is formed 3-methoxy-12-keto-17-methyl-1,3,5(10)-estratriene, having estrogenic properties. In this embodiment of my process, the 13, 17seco steroid (ketone $A_{18}$) as shown below:

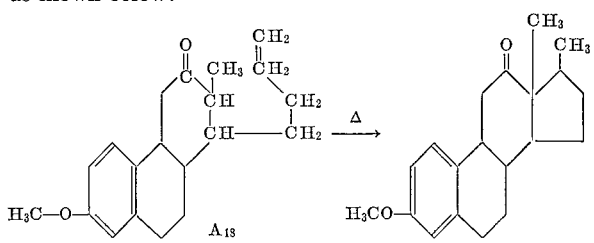

comprises the starting alkenone make up of the 12-ketone together with the 13 and 14 carbons of the C-ring of the seco-steroid and the butenyl substituent at C–14. In this embodiment $n$ is 2, $R_7$ is the C–11 methylene group of the C-ring structure, $R_6$ is the methyl group at C–13, $R_5$ is the methyne structure at C–8 of the C-ring structure, and all the other substituents are hydrogen.

In similar manner in Examples 16, 17, 19 and 25 utilizing other 7-membered alkenones and ketone derivatives thereof derived from substituted and unsubstituted carbons of the C-ring of 13,17-seco steroids there are obtained 1,3,5(10)-estratriene steroidal derivatives having valuable estrogenic properties.

In similar fashion, by utilizing as starting alkenones seco-steroids with modified A, B and C ring structures, e.g. a 3-oxygenated saturated A-ring or a $\Delta^4$-mono or $\Delta^{1,4}$-bis-dehydro structure, and a polycyclic system having B and C-rings as disclosed in Examples 17–19, there are obtained the corresponding saturated A-ring or $\Delta^4$ or $\Delta^{1,4}$-steroids of the androstane and pregnane series having the steroidal hormonal properties usually associated with naturally occurring and synthetic steroids of the androstane and pregnane series.

In general, any organic ketone or aldehyde having the requisite alkenone, alkenal, alkinone or alkinal structure such as defined hereinabove when heated at temperatures in the range of from about 200–450°, will cyclize according to my process to form an alicyclic compound vicinally substituted by an alkyl group (or substituted alkyl group) and a carbonyl function.

The following examples illustrate the process of this invention. They are not to be considered limiting, the limits of this invention being defined by the appended claims.

The nomenclature for the compounds described in the specification and claims of this application are patterned after rules set forth in The Ring Index by Patterson et al., second edition (1960) and Supplements I (1963) and II (1964) thereto published by the Chemical Abstracts Service of the American Chemical Society.

EXAMPLE 1

1-acetyl-2-methylcyclopentane

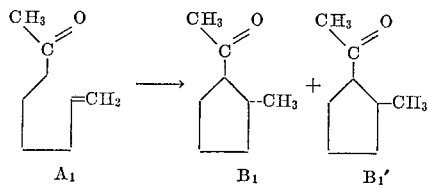

(A) The requisite intermediate i.e. 7-octen-2-one (ketone $A_1$) is prepared according to known procedures by the action of 1-bromo-4-pentene on ethylacetoacetate in the presence of sodium ethylate followed by decarbethoxylation in an acid or alkaline medium of the 3-carbethoxy-7-octen-2-one thus obtained. The 2,4-dinitro-phenylhydrazone derivative of 7-octen-2-one has an M.P. of 64° C.

(B) Heat 7-octen-2-one (ketone $A_1$) for 30 minutes at 370° C. to give cis-1-acetyl-2-methylcyclopentane (ketone $B_1$) which at 370° C. converts to an isomeric mixture comprising about 93–95% trans- 1-acetyl-2-methyl-cyclopentane (ketone $B_1$) and about 5–7% of cis-1-acetyl-2-methylcyclopentane (ketone $B′_1$) as determined by nuclear magnetic resonance (NMR) spectral data.

(C) In a manner similar to that described above, by heating 7-octen-2-one at 330° C. for 2 hours or at 280° C. for 40 hours there is obtained cis-1-acetyl-2-methyl-cyclopentane which converts to an isomeric mixture comprising trans-1-acetyl-2-methylcyclopentane and cis-1-acetyl-2-methylcyclopentane, yield greater than 90%.

EXAMPLE 2

Trans-1,2-dimethyl-1-acetylcyclopentane

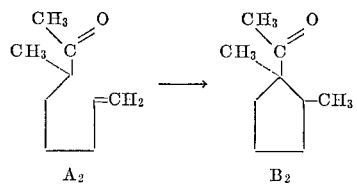

(A) The requisite starting material i.e. 3-methyl-7-octen-2-one (ketone $A_2$) is prepared according to known procedures by methylation utilizing methyl iodide of 3-carbethoxy-7-octen-2-one (prepared as described in the first paragraph of Example 1) followed by the decarbethoxylation in acid or alkaline medium of the 3-carbethoxy-3-methyl-7-octen-2-one thereby obtained. Purify the 3-methyl-7-octen-2-one by distillation, B.P. equals 182° C., the 2,4-dinitro-phenylhydrazone derivative has an M.P. equal to 43° C.

(B) Heat 3-methyl-7-octen-2-one (ketone $A_2$) at 370° C. for 30 minutes to obtain trans-1,2-dimethyl-1-acetylcyclopentane (ketone $B_2$) as determined by NMR spectral data, yield greater than 90%.

The 2,4-dinitrohydrazone derivative of trans-1,2-dimethyl-1-acetylcyclopentane has an M.P. of 116° C.

EXAMPLE 3

1-carbethoxy-2-methyl-1-acetylcyclopentane

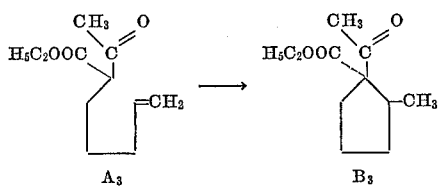

(A) The requisite starting material, i.e. 3-carbethoxy-7-octen-2-one (ketone $A_3$) is prepared according to known procedures by the action of 1-bromo-4-pentene on ethylacetoacetate in the presence of sodium ethylate. Purify by distillation, B.P. 120–122° C./20 mm.

(B) Heat 3-carbethoxy-7-octen-2-one (ketone $A_3$) for 1 hour at 300° C. to obtain 1-carbethoxy-2-methyl-1-acetylcyclopentane (ketone $B_3$) as verified by NMR spectral data.

EXAMPLE 4

1-carbethoxy - 2 - mono-deuteromethyl-1-acetylcyclopentane and 1-carbethoxy-2-methyl-1-(mono-deuteroacetyl)-cyclopentane

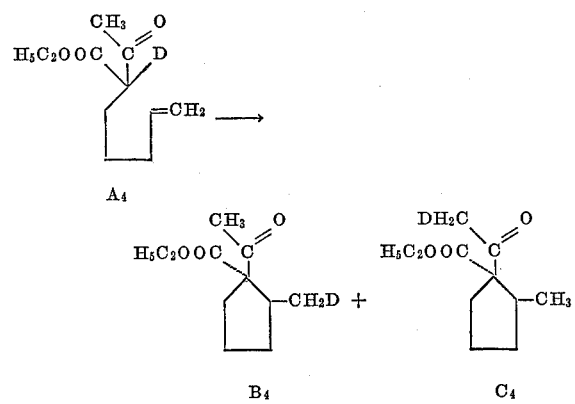

(A) The requisite starting material, i.e. 3-carbethoxy-3-deutero-7-octen-2-one (ketone $A_4$) is prepared from 3-carbethoxy-7-octen-2-one (compound of Example 3A) by treatment with deuterium oxide and sodium carbonate a few minutes at room temperature.

(B) Heat 3-carbethoxy-3-deutero-7-octen-2-one (ketone $A_4$) at 300° C. for 1 hour to get a mixture comprising 1-carbethoxy-2-mono-deuteromethyl-1-acetylcyclopentane (ketone $B_4$) together with a small amount of 1-carbethoxy-2-methyl-1-(mono-deuteroacetyl) - cyclopentane as verified by NMR spectral data (ketone $C_4$).

EXAMPLE 5

Trans-1,2-dimethyl-1-acetylcyclopentane

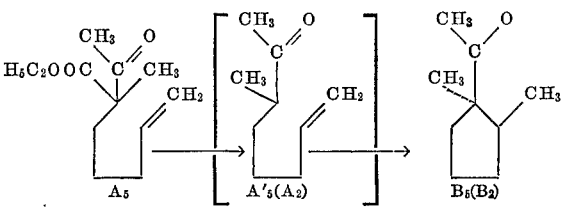

(A) The requisite starting material, i.e. 3-methyl-3-carbethoxy-7-octen-2-one (ketone $A_5$) is prepared from 1-bromo-4-pentene by reaction with ethyl acetoacetate in the presence of sodium ethylate followed by methylation of the 3-carbethoxy-7-octen-2-one thereby obtained with methyl iodide according to known procedures, to give 3-carbethoxy-3-methyl-7-octen-2-one purified by distillation; B.P. 130° C./20 mm.

(B) Heat 3-carbethoxy-3-methyl-7-octen-2-one (ketone $A_5$) for 2 hours at 345° C. (or alternatively for 90 minutes at 360° C.) whereby is first obtained the intermediate 3-methyl-7-octen-2-one (ketone $A'_5$) which converts directly to trans-1,2-dimethyl-1-acetylcyclopentane (ketone $B_5$) which is identical to ketone $B_2$ obtained in Example 2.

EXAMPLE 6

2,5-dimethyl-1-acetylcyclopentane

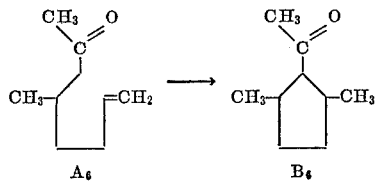

(A) The requisite starting material, i.e. 4-methyl-7-octen-2-one is prepared by the action of 1-bromo-1-methyl-4-pentene on ethylacetoacetate in the presence of sodium ethylate followed by decarbethoxylation of the 3-carbethoxy-4-methyl-7-octen-2-one thus prepared.

(B) Heat 4-methyl-7-octen-2-one (ketone $A_6$) for 30 minutes at 370° C. to obtain 2,5-dimethyl-1-acetylcyclopentane as a mixture of the stereoisomers thereof, i.e. the cis,cis, the trans,trans and the cis,trans isomers thereof as determined by NMR spectral data.

EXAMPLE 7

2,2-dimethyl-1-acetylcyclopentane

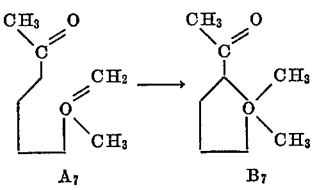

(A) The requisite starting material, i.e. 7-methyl-7-octen-2-one (ketone $A_7$) is prepared via the Wittig reaction between octane-2-7-dione and triphenylmethylphosphonium bromide 1 mole to 1 mole. The 2,4-dinitrophenylhydrazone derivative of 7-methyl-7-octen-2-one has an M.P. of 58° C.

(B) Heat 7-methyl-7-octen-2-one for 1 hour at 360° C. to get 2,2-dimethyl-1-acetylcyclopentane (ketone $B_7$); semi-carbazone derivative; M.P. 173° C.

EXAMPLE 8

2-isopropyl-5-methyl-1-acetylcyclopentane

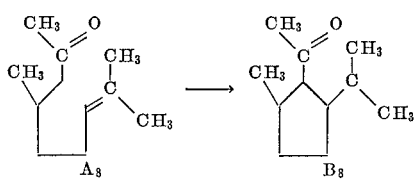

(A) The requisite starting material, i.e. 4,8-dimethyl-7-nonen-2-one (ketone $A_8$) is prepared from citronellal via a Grignard reaction utilizing methyl magnesium iodide followed by oxidation of the 2-hydroxy-4,8-dimethyl-7-nonene thereby produced with chromium trioxide in pyridine whereby is produced 4,8-dimethyl-7-nonen-2-one. The 2,4-dinitro-phenylhydrazone derivative of 4,8-dimethyl-7-nonen-2-one has an M.P. of 61° C.

(B) Heat 4,8-dimethyl-7-nonen-2-one (ketone $A_8$) at 350° C. for 40 hours (or alternatively at 370° C. for 2 hours) to obtain an isomeric mixture of 2-isopropyl-5-methyl-1-acetylcyclopentane (ketone $B_8$) as determined by NMR and infrared spectral data. Yield 50–60%.

EXAMPLE 9

2-methyl-1-acetylcyclohexane

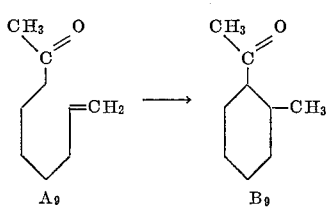

(A) The requisite starting material, i.e. 8-nonen-2-one (ketone $A_9$) is prepared by the 1,4-addition of a Grignard reagent prepared from magnesium and 1-bromo-4-pentene to methylvinylketone. Ketone $A_9$ has a 2,4-dinitrophenylhydrazone derivative melting at 50° C.

(B) Heat 8-nonen-2-one at 350° C. for one hour whereby is first obtained the cis-stereoisomeric form of ketone $B_9$, i.e. cis-2-methyl-1-acetylcyclohexane which at 350° C. converts into an isomeric mixture comprising mainly the trans-stereoisomeric form of ketone $B_9$, i.e. trans-2-methyl-1-acetylcyclohexane, together with some cis-2-methyl-1-acetylcyclohexanone as determined by NMR spectral data. Total yield of ketone $B_9$ about 80%.

EXAMPLE 10

2-methyl-1-acetylcyclononane

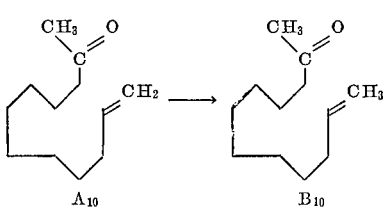

(A) The requisite starting material, i.e. 11-dodecen-2-one (ketone $A_{10}$) is prepared according to procedures described in the literature (see J. Cason and F. Prout, J. M. Cassock 66, page 46 (1944)). Ketone $A_{10}$ has a 2,4-dinitro-phenylhydrazone derivative having an M.P. of 45° C.

(B) Heat 11-dodecen-2-one (ketone $A_{10}$) for 30 minutes at 385° C. to obtain 2-methyl-1-acetylcyclononane (ketone $B_{10}$). Yield about 35%.

EXAMPLE 11

1-acetyl-7,8-dimethyl-bicyclo[3.2.1]octane

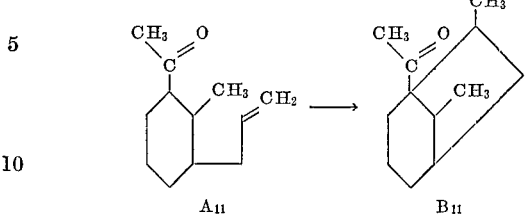

(A) The requisite starting material, i.e. 1-acetyl-2-methyl-3-[3'(1'-propenyl)]-cyclohexane (ketone $A_{11}$) is prepared via a Cope transposition (heating at 200° C.) of 1 - acetyl-1-[3'(1'-propenyl)]-2-methyl-2-cyclohexene followed by a Birch reduction (lithium in ammonia) of the 1 - acetyl-2-methyl-3-[3'(1'-propenyl]-1-cyclohexene thereby formed.

(B) Heat 1-acetyl-2-methyl - 3 - [3'(1'-propenyl)]-cyclohexane at 350° C. for one hour to give 1-acetyl-7,8-dimethyl-bicyclo [3.2.1]octane (ketone $B_{11}$) in about 90% yield as determined by NMR spectral data; 2,4-dinitro-phenylhydrazone derivative M.P.-159° C.

EXAMPLE 12

1-acetyl-2,7-dimethyl-bicyclo[2.2.1]heptane

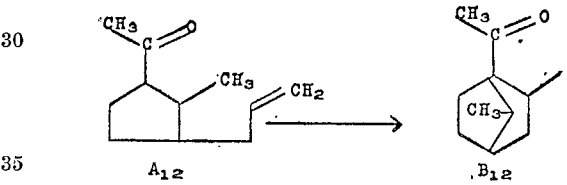

(A) The requisite starting material, i.e. 1 - acetyl-2-methyl-3-[3'(1'-propenyl)]-cyclopentane (ketone $A_{12}$) is prepared via a Cope transposition (heating at 200° C.) of 1-acetyl-1-[3'(1'-propenyl)]-2-methyl - 2 - cyclopentene followed by a Birch reduction (lithium in ammonia) of the 1-acetyl-2-methyl-3-[3'(1'-propenyl)] - 1 - cyclopentene thereby formed.

(B) Heat 1-acetyl - 2 - methyl-3-[3'(1'-propenyl)]-cyclopentane (ketone $A_{12}$) at 350° C. for a period of 50 minutes to give 1-acetyl-2,7-dimethylbicyclo[2.2.1]-heptane (ketone $B_{12}$) as determined by NMR spectral data. Yield about 70%. The 2,4-dinitro-phenylhydrazone derivative of ketone $B_{12}$ has an M.P. of 135° C. (after 4 recrystallizations).

EXAMPLE 13

3,9-dimethyl-4-hexahydroindanone

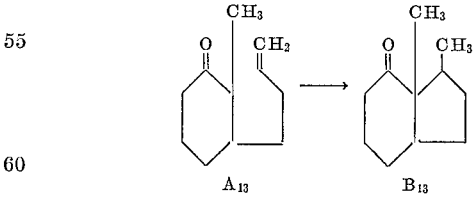

(A) The requisite starting compound, i.e. 2-methyl-3-[4'(1'-butenyl)]-cyclohexan - 1 - one (ketone $A_{13}$) is prepared by first reacting the ethyl ether of the enol form of 1,3-cyclohexanedione with a Grignard reagent prepared from magnesium and 1-bromo-3-butene, then reducing the 3-[4'(1'-butenyl)]-2 - cyclohexen - 1 - one thereby formed with lithium in ammonia (Birch) followed by the in situ addition of methyl iodide to introduce a methyl group at the 2-position, whereby is formed a stereoisomeric mixture of the cis and trans forms of 2-methyl-3-[4'(1'-butenyl)]-cyclohexan - 1 - one separable by vapor phase chromatography; the first isomeric fraction (70%) gives a 2,4-dinitro phenylhydrazone derivative have an M.P. of 79° C.; the isomer contained in the second fraction has a 2,4-dinitro phenylhydrazone derivative melting at 104° C.

(B) Heat the stereoisomeric mixture of cis and trans 2-methyl-3-[4'(1'-butenyl)]-cyclohexan - 1 - one (prepared as in above Example 13A) at 350° C. for one hour to obtain a stereoisomeric mixture of 3,9-dimethyl-4-hexahydroindanone (ketone $B_{13}$) in about 90% yield, separable by vapor phase chromatography. The isomer isolated in the first fractions yields a 2,4-dinitro-phenylhydrazone derivative melting at 123° C.; the isomer isolated in the later fractions gives a 2,4-dinitro-phenylhydrazone having an M.P.=129° C.

EXAMPLE 14

3-methyl-4-hexahydroindanone

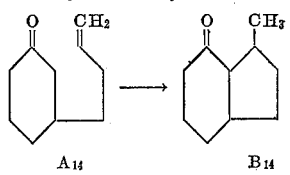

(A) The requisite starting material, i.e. 3-[4'(1'-butenyl)]-cyclohexan-1-one (ketone $A_{14}$) is prepared from the ethyl ether of the enol form of 1,3-cyclohexanedione according to a procedure similar to that described in Example 13A, but eliminating the final step therein, i.e. the in situ addition of methyl iodide. The 2,4-dinitrophenylhydrazone derivative of 3-[4'(1'-butenyl)]-cyclohexan-1-one has an M.P. of 114° C.

(B) Heat 3-[4'-(1'-butenyl)]-cyclohexan-1-one (ketone $A_{14}$) at 350° C. for one hour to obtain a stereoisomeric mixture of two 3-methyl-4-hexahydro-indanone (ketone $B_{14}$) and a third ketone in about 90% yield as determined by NMR spectral data. Separate isomers via vapor phase chromatography; the first fraction (66%) gives a 2,4-dinitro-phenylhydrazone having an M.P.=198° C.; the second fraction (17%) gives a 2,4-dinitro-phenylhydrazone derivative having an M.P.=152° C.; the third fraction (17%) gives a 2,4-dinitro-phenylhydrazone derivative having an M.P.=184° C.

The spectral data show that the first and third fractions are the trans and cis forms of ketone $B_{14}$, respectively; the second fraction is 4-methyl-bicyclo-[3.2.2]-nonane-6-one.

EXAMPLE 15

1-methyl-spiro[4.5]decan-6-one

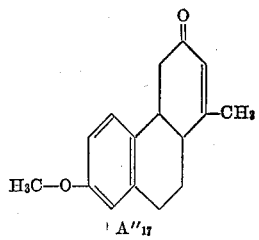

(A) The requisite starting compound, i.e. 2-[5'(1'-pentenyl)]-cyclohexan-1-one (ketone $A_{15}$) is prepared by alkylating cyclohexanone in the presence of sodium t-amylate utilizing 1 - bromo-4-pentene as an alkylating agent. Ketone $A_{15}$ has a 2,4-dinitrophenylhydrazone derivative having an M.P. of 85.5° C.

(B) Heat 2-[5'(1'-pentenyl)]-cyclohexan - 1 - one at 350° C. for one hour to obtain cis-1-methyl-spiro[4.5]-decan-6-one (ketone $B_{15}$) in about 95% yield as determined by NMR spectral data; the 2,4 - dinitrophenylhydrazone derivative of ketone $B_{15}$ has an M.P.=146° C.

EXAMPLE 16

3-methoxy-17-acetyl-1,3,5(10)-estratriene municating channels above and below the intermedi-

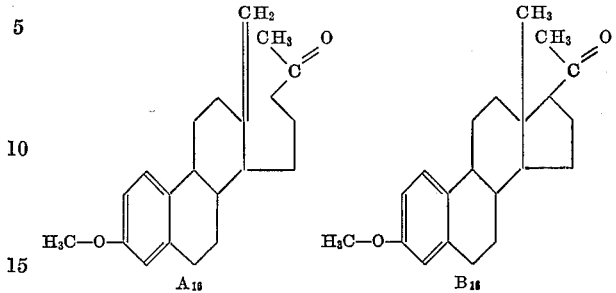

(A) In a manner similar to that described in Example 7B, heat 3-methoxy-17-acetyl - 13,17 - seco-1,3,5(10),13 (18)-estratetraene (ketone $A_{16}$) at about 350° C. for one hour to obtain 3-methoxy-17-acetyl-1,3,5(10)-estratriene (ketone $B_{16}$).

EXAMPLE 17

3-methoxy-12-keto-17-methyl-1,3,5(10),8(14)-estratetraene or its -1,3,5(10),14-estratetraene isomer (A) 3-methoxy-12-keto-17-methylene - 13,17 - seco-1,3,5 (10),13-estratetraene (ketone $A_{17}$)

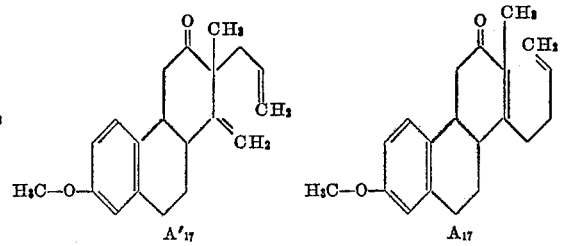

Treat 3-methoxy-12-keto-14-methyl-6,7,8,9,11,12-hexahydrophenanthrene (ketone $A''_{17}$) according to procedures known in the art for methylating an $\alpha(\beta)$-unsaturated ketone (preferably under basic conditions) followed by allylation according to known procedures, of the resulting α-methyl-12-ketone derivative thereby produced, to obtain 3-methoxy-12-keto-13-methyl-13-[3'(1'-propenyl)]-14-methylene - 6,7,8,9,11,12,13,14 - octohydrophenanthrene (ketone $A'_{17}$).

Heat ketone $A'_{17}$ at about 200° C. to effect a Cope transposition to obtain 3-methoxy-12-keto-13-methyl-14-[4'(1'-butenyl)] - 6,7,8,9,11,12 - hexahydrophenanthrene (which is also named 3-methoxy-12-keto-17-methylene-13, 17-seco-1,3,5(10),13-estratetraene) (ketone $A_{17}$).

The numbering of the positions in the phenanthrene ring used in this application for phenanthrene derivatives are in accordance with that recommended for steroids (see Patterson et al. The Ring Index (second edition), McGregor and Wernar, Inc., Washington, D.C. (1960) page 1275 section 22.5).

(B) 3-methoxy-12-keto-17-methyl - 1,3,5(10),8(14) (or 14)-estratetriene (ketone $B_{17}$)

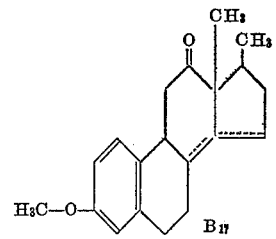

Heat 3-methoxy-12-keto-17-methylene-13,17-seco-1,3,5 (10),13-estratetraene (ketone $A_{17}$) at about 250° C. to obtain 3-methoxy-12-keto-17-methyl - 1,3,5(10),8(14) (or 14)-estratetriene (ketone $B_{17}$).

EXAMPLE 18

3-methoxy-12-keto-17-methyl-1,3,5(10)-estratriene (ketone $B_{18}$)

(A) 3-methoxy-12-keto-17 - methylene - 13,17-seco-1,3,5(10)-estratriene (ketone $A_{18}$)

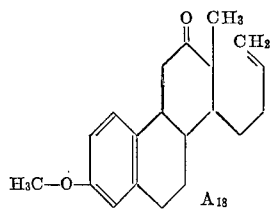

Treat 3-methoxy-12-keto-17-methylene-13,17-seco-1,3,5(10),13-estratetriene (ketone $A_{17}$) (prepared according to the procedure of Example 17A) with lithium in liquid ammonia (Birch reduction) followed by treatment with dichlorodicyanobenzoquinone to regenerate the aromatic A-ring according to known procedures to obtain 3-methoxy-12-keto-17-methylene-13,17 - seco - 1,3,5(10)-estratriene (ketone $A_{18}$).

Alternatively, the compound of this example is prepared as follows:

Treat the mono-ethylenedioxy-ketal of diacetyl with 1-hexene-6-triphenylphosphonium bromide (prepared by reaction of 6-bromo-1-hexene with triphenylphosphine) in the presence of potassium tertiary amylate followed by treatment with acid to give 3-methyl-3,7-octadiene-2-one.

React 3-methyl-3,7-octadiene-2-one with 6-methoxy-1-tetralone in the presence of an alkali metal alcoholate (e.g. sodium ethylate), under the usual conditions of Michael condensations, to obtain 3-methoxy-12-keto-17-methylene - 13,17 - seco - 1,3,5(10),9(11)-estratetraene which upon reduction with lithium in liquid ammonia followed by treatment with dichlorodicyanobenzoquinone to regenerate the aromatic A-ring yields 3-methoxy-12-keto-17-methylene-13,17 - seco - 1,3,5(10)-estratriene (ketone $A_{18}$).

(B) 3-methoxy-12-keto-17-methyl - 1,3,5(10) - estratriene (ketone $B_{18}$)

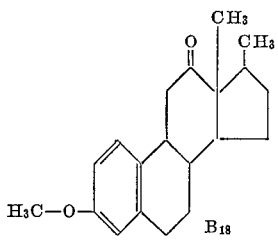

Heat 3-methoxy-12-keto-17-methylene-13,17-seco-1,3,5(10)-estratriene (ketone $A_{18}$) at about 350° C. to obtain 3-methoxy-12-keto-17-methyl-1,3,5(10) - estratriene (ketone $B_{18}$).

EXAMPLE 19

3 - methoxy-13-acetyl-17-methyl-18-nor-1,3,5(10) - estratriene (3-methoxy-13-acetyl-17-methyl-1,3,5,(10)-gonatriene) (ketone $B_{19}$)

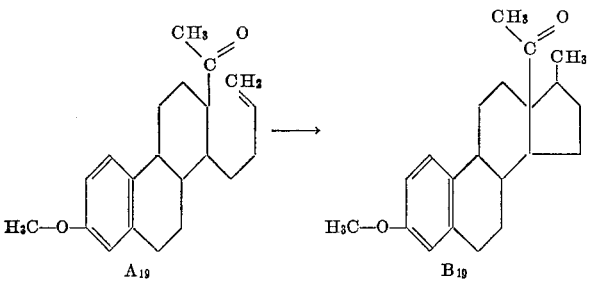

(A) Heat 3-methoxy-13-acetyl-14-[4'(1'-butenyl)]-6,7,8,9,11,12,13,14-octaohydrophenanthrene (ketone $A_{19}$) at about 350° C. to obtain 3-methoxy-13-acetyl-17-methyl-1,3,5(10)-gonatriene (ketone $B_{19}$).

EXAMPLE 20

1-acetyl-2-methylcyclopentene (thermocyclization of 7-octyn-2-one)

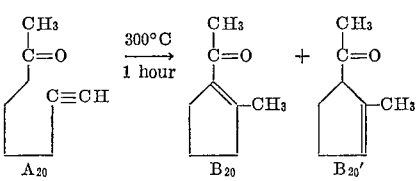

(A) The requisite starting compound, i.e., 7-octyn-2-one (ketone $A_{20}$) is prepared by the action of sodium acetylide on the ethylene acetal of 6-bromo-2-hexanone followed by acid hydrolysis. Ketone $A_{20}$ has a 2,4-dinitrophenylhydrazone derivative melting at 91° C.

(B) Heat 7-octyn-2-one (ketone $A_{20}$) in a sealed Pyrex tube at 300° C. for 1 hour whereby is obtained a mixture comprising 1-acetyl-2-methyl-1-cyclopentene (ketone $B_{20}$) in about 85% yield and 1-acetyl-2-methyl-2-cyclopentene (ketone $B'_{20}$) in about 15% yield. Ketones $B_{20}$ and $B'_{20}$ are isolated by means of vapor phase chromatography and their structures established by infrared and NMR spectral data.

Ketones $B_{20}$ and $B'_{20}$ are known compounds and are converted to the same 2,4-dinitro-phenylhydrazone derivative melting at 170–171° C.

EXAMPLE 21

1-benzoyl-1,2-dimethyl-2-cyclopentene (thermocyclization of 6-benzoyl-1-heptyne)

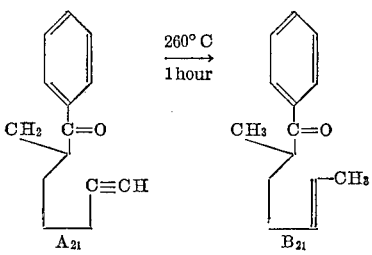

(A) The requisite starting compound, i.e. 6-benzoyl-1-heptyne (ketone $A_{21}$) is prepared by alkylating propiophenone in the presence of sodium t-amylate utilizing 5-bromo-1-pentyne. Ketone $A_{21}$ has a 2,4-dinitro-phenylhydrazone derivative melting at 100° C.

(B) Heat 6-benzoyl-1-heptyne at 260° C. for 1 hour to obtain 1-benzoyl-1,2-dimethyl-2-cyclopentene (ketone $B_{21}$) in substantially quantitative yields. The structure of ketone $B_{21}$ is characterized by means of infrared and NMR spectral data. The 2,4-dinitro-phenylhydrazone derivative of ketone $B_{21}$ has an M.P. of 168–169° C.

EXAMPLE 22

Trans-1-acetyl-2-methylcyclopentane (thermocyclization of the diethyl ketal and of the ethyl enol ethers of 7-octen-2-one)

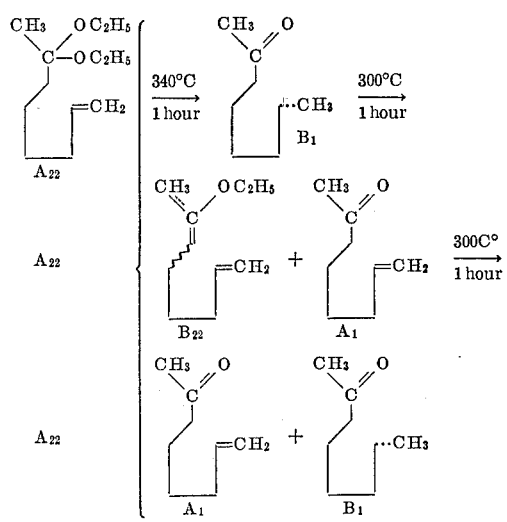

(A) The requisite intermediate, i.e. the diethyl ketal of 7-octen-2-one (diethyl ketal $A_{22}$) is prepared according to known procedures by the action of ethyl orthoformate on 7-octen-2-one in ethanol in the presence of catalytic amounts of p-toluenesulfonic acid. The resultant product is isolated by distillation (B.P. 95–98° C./25 mm. Hg) and purified via vapor phase chromatography at 100° C. on a cyano-silicone column (XF 1150), the structure of diethyl ketal $A_{22}$ being verified by infrared and NMR spectral data.

(B) Heat diethyl ketal $A_{22}$ at 340° C. for one hour to obtain trans-2-methyl-1-acetylcyclopentane as determined by infrared and NMR spectral data.

Heat diethyl ketal $A_{22}$ at 300° C. for one hour to obtain in about 50% yield a mixture of products comprising about 40% of 7-octen-2-one (ketone $A_1$) and about 60% of a mixture comprising 3 isomeric enol ethyl ethers of 7-octen-2-one (enol ethers $B_{22}$). The enol ether mixture (product $B_{22}$) comprise 2-ethoxy-1,7-octadiene and the cis and trans isomeric forms of 2-ethoxy-2,7-octadiene as determined by infrared and NMR spectral data. The mixture comprising the ketone $A_1$ and the enol ethyl ethers $B_{22}$ are separated via vapor phase chromatography at 120° C. on a cyano-silicone column (XF 1150).

By heating the diethyl ketal $A_{22}$ at 300° C. for three hours, there is obtained in about 50% yield a mixture comprising about 80% of 7-octen-2-one (ketone $A_1$) and about 20% of trans-2-methyl-1-acetylcyclopentane (ketone $B_1$). Ketones $A_1$ and $B_1$ are separated via vapor phase chromatography and their structures determined by infrared and NMR spectral data.

EXAMPLE 23

Trans-2-methyl-1-acetylcyclopentane (thermocyclization of the dimethyl ketal and the methyl enol ethers of 7-octen-2-one)

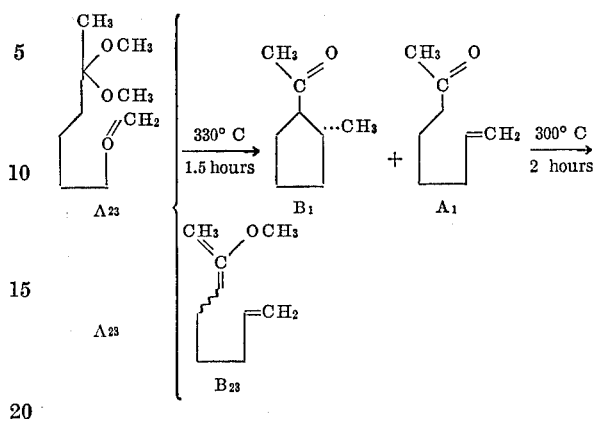

(A) The requisite starting material, i.e. the dimethyl ketal of 7-octen-2-one (ketal $A_{23}$) is prepared according to known procedures by treating 7-octen-2-one with methyl orthoformate in methanol in the presence of sulfuric acid. The dimethyl ketal $A_{23}$ is purified by distillation (B.P.=83–85° C./23 mm. Hg) and identified by infrared and NMR spectral data.

(B) Heat the dimethyl ketal $A_{23}$ at 330° C. for 1½ hours in a sealed ampule to obtain (with a yield of about 30%) a mixture comprising about 70% trans-2-methyl-1-acetylcyclopentane (ketone $B_1$) and about 20% of 7-octen-2-one (ketone $A_1$) and about 10% of the third ketone having a 2,4-dinitro-phenylhydrazone derivative melting at 91–93° C. Separate ketones $A_1$ and $B_1$ from the mixture by means of vapor phase chromatography on a cyano-silicone 1150 column. The NMR spectra of ketone $B_1$ obtained above is identical with that of ketone $B_1$ obtained in Example 1.

Heat the dimethyl ketal $A_{23}$ in a sealed ampule at 300° C. for two hours to obtain in almost quantitative yields an isomeric mixture of the 2-methoxy enol ether or 7-octen-2-one (enol ether $B_{23}$) comprising 2-methoxy-1,7-octadiene and the cis and trans isomeric forms of 2-methoxy-2,7-octadiene as identified by infrared and NMR spectral data.

EXAMPLE 24

Trans - 2 - methyl-1-acetylcyclopentane (thermocyclization of the ethylene ketal derivative of 7-octen-2-one)

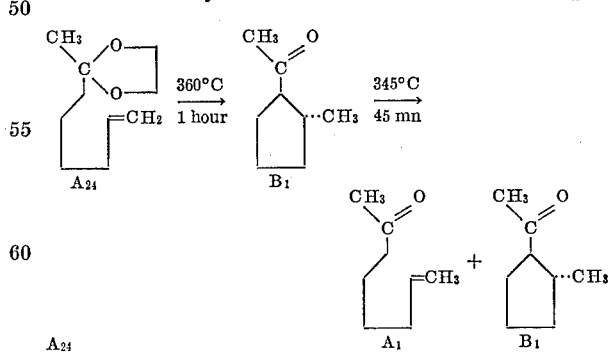

(A) The requisite starting compound, i.e. the ethylene ketal of 7-octen-2-one (ethylene ketal $A_{24}$) is prepared according to known procedures by the action of ethylene glycol on 7-octen-2-one in the presence of p-toluenesulfonic acid. Purify by distillation (B.P. 87–89° C./14 mm. Hg).

(B) Heat the ethylene ketal $A_{24}$ at 360° C. for one hour in a sealed ampule to obtain trans-2-methyl-1-acetylcyclopentane (ketone $B_1$). Isolate and purify by vapor phase chromatography.

Heat the ethylene ketal at 355° C. for 45 minutes in a sealed ampule to obtain trans-2-methyl-1-acetylcyclopentane (ketone B₁) and 7-octen-2-one (ketone A₁) as identified by infrared and NMR spectral data. The mixture of ketones A₁ and B₁ are separated by vapor phase chromatography.

In these procedures, by adding water to the ethylene ketal, A₂₄ (about 1:1) prior to heating in a sealed ampule at the temperatures indicated above, the yields of cyclized ketone, B₁, are increased to about 50% yield.

EXAMPLE 25

3-methoxy - 17 - acetyl-1,3,5(10)-estratriene (thermocyclization of the diethyl ketal of 3-methoxy-17-acetyl-13,17-seco-1,3,5(10),13(18)-estratetraene)

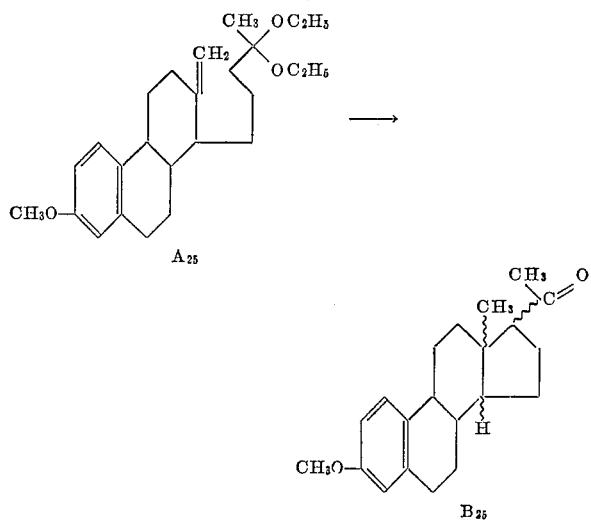

(A) Utilizing procedures similar to those known in the art, the diethyl ketal A₂₅ is prepared via a Wittig reaction by the action of methyltriphenylphosphonium bromide on 3-methoxy - 17 - acetyl - 13,17-seco-1,3,5(10)-estratriene-13-one 20-diethyl ketal, in the presence of potassium tert.-amylate.

(B) Heat diethyl ketal A₂₅ at about 340° C. for one hour to obtain 3-methoxy-17-acetyl-1,3,5(10)-estratriene (ketone B₂₅).

EXAMPLE 26

3-acetyl-9-methtyl-hexahydroindane (thermocyclization of the diethyl ketal of 1-methylene 2-(4'-pentanone)-cyclohexane)

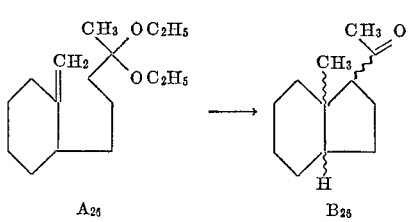

(A) The requisite starting compound, i.e. the diethyl ketal of 1-methylene-2-(4'-pentanone)-cyclohexane (diethyl ketal A₂₆) is obtained according to known procedures similar to that described in Example 25A by the action of methyltriphenyl-phosphonium bromide on 1-keto-2-(4'-pentanone diethyl ketal)-cyclohexane in the presence of potassium tert.-amylate.

(B) Heat diethyl ketal A₂₆ in a sealed ampule for one hour at 340° C. to obtain a stereoisomeric mixture of 3-acetyl-9-methylhexahydroindane (ketone B₂₆) in improved yields. Alternatively, the ketones B₂₆ are obtained by heating the corresponding ethylene ketal of A₂₆ with an approximately equivalent amount of water, in a sealed ampule for an hour at 340° C.

EXAMPLE 27

Trans-2-methyl-1-acetylcyclopentane (thermocyclization of the enol acetate of 7-octen-2-one)

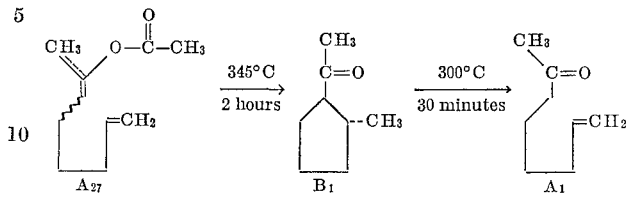

(A) The requisite starting material, i.e. the enol acetate of 7-octen-2-one (enol acetate A₂₇) is prepared according to known procedures by treating 7-octen-2-one with isopropenyl acetate in the presence of p-toluenesulfonic acid. The enol acetate A₂₇ formed is a mixture of three isomers as determined by infrared and NMR spectral data, i.e. cis-2-acetoxy-2,7-octadiene ($n_D^{20}$=1.4388), trans-2-acetoxy-2,7-octadiene ($n_D^{18}$=1.4426) and 2-acetoxy-1,7-octadiene ($n_D^{23}$=1.4382). The isomers are separated via vapor phase chromatography on a carbowax column at 135° C.

(B) Heat the enol acetate A₂₇ (either an isomeric mixture thereof or any one if the three isomers of which it is comprised) at 345° C. for two hours in a sealed ampule to give an almost quantitative yield of trans-2-methyl-1-acetylcyclopentane (ketone B₁) as identified by infrared and MMR spectral data.

Heat the enol acetate A₂₇ (either the isomeric mixture or any one of the three isomers of which it is comprised) at 300° C. for 30 mnutes in a sealed tube to obtain an almost quantitative yield of 7-octen-2-one (ketone A₁).

EXAMPLE 28

Trans-2-methyl-1-acetylcyclopentane (thermocyclization of a mixture of the ethyl enol ethers or of a mixture of the methyl enol ethers of 7-octen-2-one)

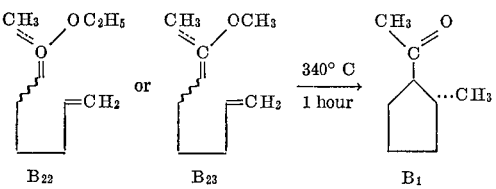

(A) The starting compounds, A₂₂ and A₂₃, are prepared according to the procedures described in Examples 22A and 23A, respectively.

(B) Heat a mixture comprising the diethyl ketals A₂₂ or the dimethyl ketals A₂₃ for one hour at 340° C. to obtain trans-2-methyl-1-acetylcyclopentane (ketone B₁) and 7-octen-2-one (ketone A₁).

EXAMPLE 29

1-formyl-2-methyl-cyclopentane— thermocyclization of 6-heptenal

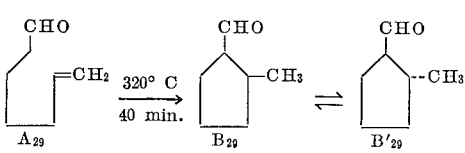

The requisite intermediate, 6-heptenal (A₂₉) is prepared according to procedures known in the art by the action of dimethyl formamide on the Grignard reagent 5-hexenyl-1-magnesium bromide.

Heat very pure 6-heptenal (aldehyde A₂₉) in a sealed ampule at 320° C for 40 minutes to obtain an equilibrium mixture of cis-1-formyl-2-methylcyclopentane (aldehyde B₂₉) and trans-1-formyl-2-methylcyclopentane (aldehyde B'₂₉). Isolate the isomeric mixture of 1-formyl-2-methylcyclopentane by vapor phase chromatography.

EXAMPLE 30

Trans-1,2-dimethyl-1-formylcyclopentane (A) Thermocyclization of 2-methyl-6-heptenal

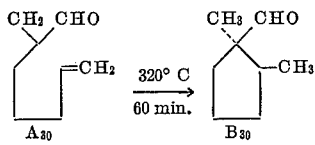

The requisite starting compound, i.e. 2-methyl-6-heptenal (aldehyde $A_{30}$) is prepared according to procedures known in the art by the action of the magnesium derivative of chloromethyl ethyl ether on 6-hepten-2-one followed by treatment of the thereby formed intermediate first with formic acid and then with water. The aldehyde $A_{30}$ thereby formed gives a 2,4-dinitro-phenylhydrazone derivative, M.P. 80° C.

Heat pure 2-methyl-6-heptenal (aldehyde $A_{30}$) in a sealed ampule at 320° C. for 60 minutes to give trans-1,2-dimethyl-1-formylcyclopentane, aldehyde $B_{30}$ (wherein the two methyl groups are in trans position and the 1-methyl and 2-formyl functions are in cis position). Aldehyde $B_{30}$ gives a 2,4-dinitro-phenylhydrazone derivative having a melting point which has two fusion points, 111° C. and 132° C.

(B) Thermocyclization of the diethyl ketal of 2-methyl-6-heptenal

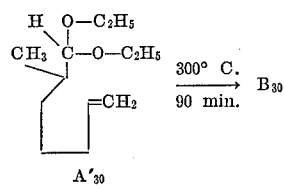

The requisite starting compound, i.e. the diethyl ketal of 2 methyl-6-heptenal(diethyl ketal $A'_{30}$) is prepared, according to known procedures by the action of ethyl orthoformate on 2-methyl-6-heptenal. Isolate and purify by distillation.

In a sealed ampule, heat the ethylene acetal of 2-methyl-6-heptenal (acetal $A'_{30}$) at 300° C. for 90 minutes to obtain trans-1,2-dimethyl-1-formylcyclopentane (aldehyde $B_{30}$).

EXAMPLE 31

1-methyl-1a-formylhydrindane (thermocyclization of 1-formyl-2-(3'-butenyl)-cyclohexane)

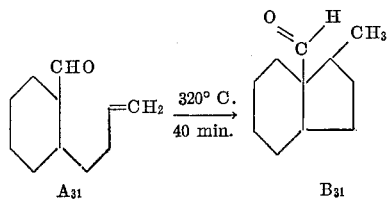

(A) The requisite starting compound, i.e. 1-formyl-2-(3'-butenyl)-cyclohexane (aldehyde $A_{31}$) is prepared by the action of the magnesium derivative of chloromethyl ethyl ether on 2-(3'-butenyl)-cyclohexanone followed by treatment of the thereby formed intermediate with formic acid and then with water. The resulting aldehyde $A_{31}$ gives a 2,4-dinitro-phenylhydrazone derivative, M.P. 123° C.–124° C.

(B) Heat in a sealed ampule 1-formyl-2-(3'-butenyl)-cyclohexane (aldehyde $A_{31}$) at 320° C. for 40 minutes to obtain 1-methyl-1a-formylhydrindane (aldehyde $B_{31}$). The aldehyde $B_{31}$ gives a 2,4-dinitrophenylhydrazone derivative, M.P. 143–145° C.

EXAMPLE 32

2 - carbomethoxymethyl-1-acetylcyclopentane (thermocyclization of cis- and trans-9-carbomethoxy-7-nonen-2-one)

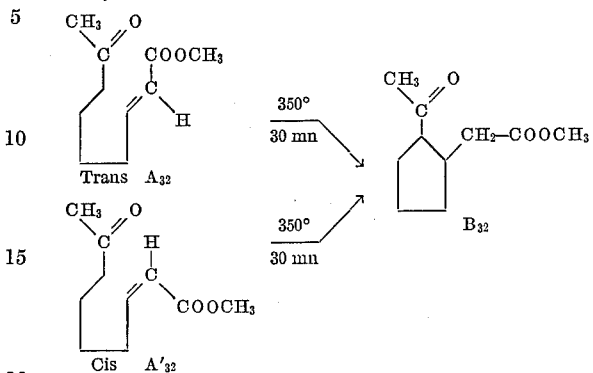

(A) The requisite starting compounds (ketones $A_{32}$ and $A'_{32}$) are prepared by esterifying an isomeric mixture of cis- and trans-8-keto-2-nonenoic acid in methanol in the presence of sulfuric acid. The resultant isomeric mixture of the corresponding methyl esters (ketones $A_{32}$ and $A'_{32}$) are separable by vapor phase chromatography. Trans-ketone $A_{32}$ has a melting point of 117° C.

(B) Heat trans-9-carbomethoxy-7-nonen-2-one (ketone $A_{32}$) or cis-9-carboxmethoxy-7-nonen-2-one (ketone $A'_{32}$) or mixtures of ketones $A_{32}$ and $A'_{32}$ in a sealed ampule for 30 minutes at 350° C. to obtain almost 100% yield of a cis and trans equilibrium mixture of 2-carbomethoxymethyl - 1 - acetylcyclopentane (ketone $B_{32}$) containing about 95% of the trans-isomer and about 5% of the cis-isomer. The structure of ketone $B_{32}$ is established by infrared and NMR data.

The trans form of ketone $B_{32}$ has a dinitro-phenylhydrazone melting at 80° C.

I claim:

1. The process which comprises heating, at a temperature in the range of from about 200° C. to about 450° C., an unsaturated, aliphatic, carbonyl compound selected from the group consisting of an alkenone, an alkenal, an alkinone, an alkinal, and carbonyl derivatives thereof, said unsaturated aliphatic carbonyl compound having a moiety comprising at least seven carbon atoms in a straight chain wherein there is an unsaturated bond between the first and second carbon atoms at one end of said straight chain and the carbonyl function includes the last carbon atom at the other end of said chain and wherein there is at least one hydrogen on the carbon alpha to said carbonyl function, said moiety of said unsaturated aliphatic carbonyl compound being selected from the group consisting of a carbonyl moiety of the following structural Formulae I and II and carbonyl derivatives thereof:

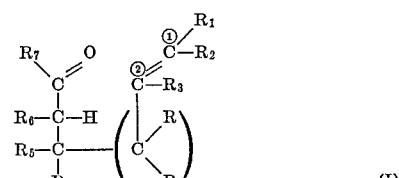

(I)

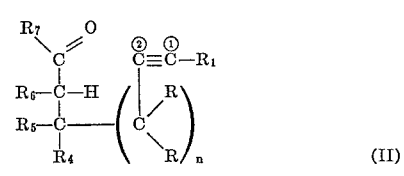

(II)

wherein said first and second carbon atoms are numbered as ① and ②; n is an integer from 2 to 6; and R, $R_1$, $R_2$, $R_3$, $R_4$, $R_5$, $R_6$, and $R_7$ are members selected from the group consisting of hydrogen and a hydrocarbon radical;

whereby said hydrogen on the carbon alpha to said carbonyl function transfers to said first carbon atom and said alpha carbon becomes bonded to said second carbon and there is formed an alicyclic compound having an alkyl substituent on said second carbon atom and a vicinal-carbonyl substituent, the alicyclic ring having two carbons less than said straight chain moiety in said saturated aliphatic carbonyl compound; and when said unsaturated bond between the first and second carbon atoms of said starting unsaturated aliphatic carbonyl compound is a triple bond, said alicyclic compound also has a double bond stemming from said second carbon atom, the alicyclic compound thereby formed having a moiety selected from the group consisting of an alkyl-cycloalkane of the following structural Formula III when derived from an unsaturated aliphatic carbonyl compound of Formula I:

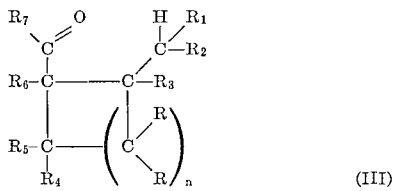

wherein $n$, $R$, $R_1$, $R_2$, $R_3$, $R_4$, $R_5$, $R_6$, and $R_7$ are as hereinabove defined; and a 2-dehydro analog of Formula III when derived from an unsaturated aliphatic carbonyl compound of Formula II, said 2-dehydro analog being a 2(1)-dehydro analog when $R$ and $R_6$ are hydrocarbon radicals.

2. The process according to claim 1 wherein said unsaturated aliphatic carbonyl compound is selected from the group consisting of an alkenone of Formula I wherein $R_7$ is a hydrocarbon radical, and carbonyl derivatives thereof, whereby there is formed an alkyl-cycloalkane of Formula III wherein $R_7$ is a hydrocarbon radical.

3. The process according to claim 2 wherein said temperature is in the range of from about 275° C. to about 425° C.

4. The process of claim 2 wherein said temperature is within the range of from about 275° C. to about 425° C. and wherein said alkenone of Formula I is a compound wherein $R_7$ is a hydrocarbon radical and $n$ is 2, whereby there is formed an alkyl-cyclopentane of Formula III wherein $R_7$ is a hydrocarbon radical and $n$ is 2.

5. The process of claim 2 wherein said alkenone is 1-acetyl-2-methyl-3-[3'(1'-propenyl)] - cyclohexane, said temperature is about 350° C., and said alkylcycloalkane thereby formed is 1-acetyl17,8-dimethyl-bicyclo[3.2.1] octane.

6. The process of claim 2 wherein said alkenone is 1-acetyl-2-methyl-3-[3'(1'-propenyl)] - cyclopentane, said temperature is about 350° C., and said alkylcycloalkane thereby formed is 1-acetyl-2,7-dimethyl-bicyclo[2.2.1] heptane.

7. The process of claim 2 wherein said alkenone is 11-dodecen-2-one, said temperature is about 385° C., and said alkyl-cycloalkane thereby formed is 2-methyl-1-acetyl-cyclononane.

8. The process of claim 2 wherein said alkenone is 3-methoxy-12-keto-17-methylene-13,17- seco - 1,3,5(10)-estratriene, said temperature is about 350° C., and said alkylcycloalkane thereby formed is 3-methoxy-12-keto-17-methyl-1,3,5(10)-estratriene.

9. The process of claim 2 wherein said alkenone is 3-methoxy-13-acetyl-17-methylene-13,17 - seco - 1,3,5(10)-gonatriene, said temperature is about 350° C., and said alkylcycloalkane thereby formed is 3-methoxy-13-acetyl-17-methyl-1,3,5(10)-gonatriene.

10. The process according to claim 2 wherein said alkenone is 3-methoxy-17-acetyl-13-methylene-13,17-seco-1,3,5(10)-gonatriene, said temperature is about 350° C., and said cycloalkane thereby formed is 3-methoxy-17-acetyl-1,3,5(10)-estratriene.

11. The process according to claim 1 wherein said unsaturated aliphatic carbonyl compound is selected from the group consisting of an alkinone of Formula II wherein $R_7$ is a hydrocarbon radical and $n$ is 2, and carbonyl derivatives thereof, whereby there is formed a 2-dehydro analog of Formula III wherein $R_7$ is a hydrocarbon radical and $n$ is 2, said 2-dehydro analog being a 2(1)-dehydro analog when $R$ and $R_6$ are hydrocarbon radicals.

12. The process according to claim 11 wherein said temperature is in the range of from about 250° C. to about 300° C.

13. The process according to claim 11 wherein said alkinone is 7-octyn-2-one, said temperature is about 300° C., and said alkylcycloalkane thereby formed comprises a mixture of 1-acetyl-2-methyl-1-cyclopentene and 1-acetyl-2-methyl-2-cyclopentene.

14. The process according to claim 1 wherein said unsaturated aliphatic carbonyl compound is a compound selected from the group consisting of an alkenal of Formula I wherein $R_7$ is hydrogen and $n$ is 2, and carbonyl derivatives thereof, whereby there is formed an alkyl-cycloalkane of Formula III wherein $R_7$ is hydrogen and $n$ is 2.

15. The process according to claim 14 wherein the temperature is in the range of from about 225° C. to about 375° C.

16. The process according to claim 14 wherein said alkenal is 1-formyl-2-(3'-butenyl)-cyclohexane, said temperature is about 300° C. and said alicyclic compound thereby formed is 1-methyl-1a-formylhydrindane.

17. The process according to claim 1 wherein said unsaturated aliphatic carbonyl compound is a carbonyl derivative of an alkenone of Formula I wherein $R_7$ is a hydrocarbon radical and $n$ is 2, said carbonyl derivative being selected from the group consisting of dialkyl ketals, cyclic ketals, enol esters and enol ethers, whereby there is formed an alkyl-cycloalkane of Formula III wherein $R_7$ is a hydrocarbon radical and $n$ is 2.

18. The process according to claim 17 when carried out in the presence of water.

19. An alicyclic compound selected from the group consisting of:
2-methyl-1-acetylcyclononane,
1-acetyl-7,8-dimethyl-bicyclo [3.2.1]octane,
1-acetyl-2,7-dimethyl-bicyclo[2.2.1]heptane,
3,9,-dimethyl-4-hexahydroindanone,
3-methyl-4-hexahydroindanone,
1-methyl-spiro[4.5]decan-6-one,
[3-methoxy-17-acetyl-1,3,5(10)-estratriene],
3-methoxy-12-keto-17-methyl-1,3,5(10)-estratriene,
3-methoxy-13-acetyl-17-methyl-1,3,5(10)-gonatriene,
1-benzoyl-1,2-dimethyl-2-cyclopentene,
1-formyl-1,2,-dimethyl-cyclopentane,
1-methyl-1a-formylhydrindane.

References Cited
UNITED STATES PATENTS 2,773,886   12/1956   Velluz et al. _____ 260—397.5

ELBERT L. ROBERTS, Primary Examiner

U.S. Cl. X.R.

260—397.45, 586, 591, 598

UNITED STATES PATENT OFFICE
CERTIFICATE OF CORRECTION

Patent No. 3,531,504            Dated September 29, 1970

Inventor(s) Jean-Marie Conia

It is certified that error appears in the above-identified patent and that said Letters Patent are hereby corrected as shown below:

Column 20, line 48, "(A) The starting compounds, $A_{22}$ and $A_{23}$" should read ---(A) The starting compounds, $B_{22}$ and $B_{23}$ ---.

| Patent No. 3,531,504 reads: | Patent should read as correctly appears in Application S.N. 642,352 |
|---|---|
| Column 3, line 73 | Page 7, line 30 |
| ...including possessing... | ...including radicals possessing. |
| Column 6, lines 60 - 65 | Page 14, lines 21 - 27 Formula $(B_1, B'_1)$ |
| 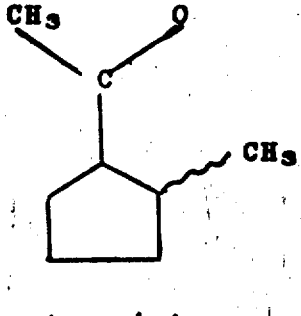 $(B_1, B'_1)$ | 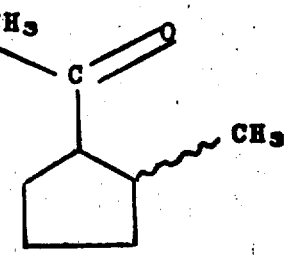 $(B_1, B'_1)$ |

| Patent No. 3,531,504 reads: | Patent should read as correctly appears in Application S.N. 642,352: |
Column 7, line 6 | Page 15, line 5
3-[1'(1'-propenyl)] | 3-[3'(1'-propenyl)]
Column 7, lines 10 - 18
Formula $A_{11}$ | Page 15, lines 10 - 16
Formula $A_{11}$
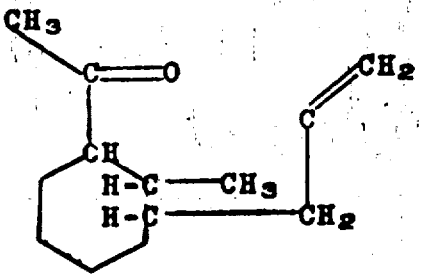
$A_{11}$
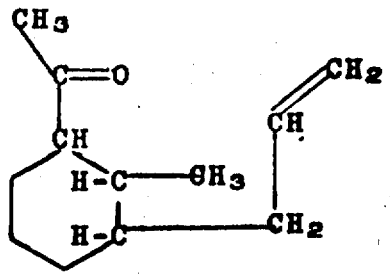
$A_{11}$
Column 7, lines 10 - 18
Formula $B_{11}$ | Page 15, lines 10 - 16
Formula $B_{11}$
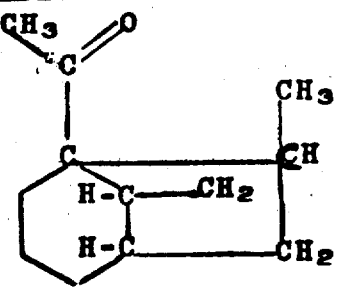
$B_{11}$
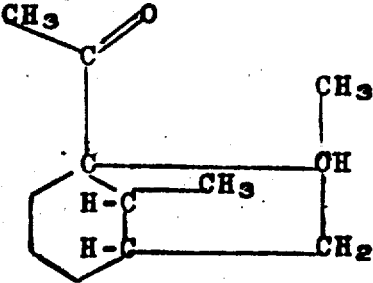
$B_{11}$
Column 7, lines 58 - 68
Formula $A_{18}$ | Page 17, lines 10 - 15
Formula $A_{18}$
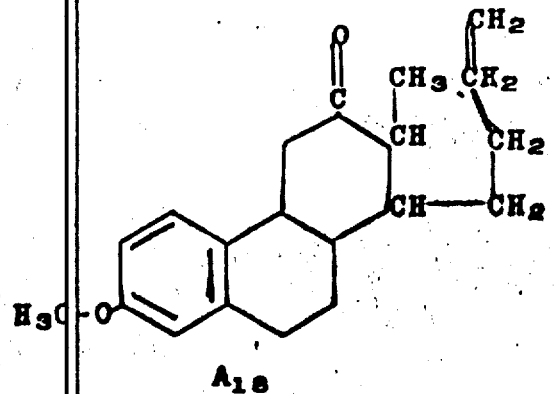
$A_{18}$
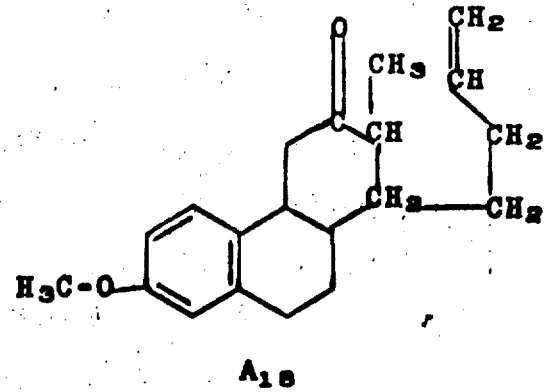
$A_{18}$
-2-

| Patent No. 3,531,504 reads: | Patent should read as correctly appears in Application S.N. 642,352 |
|---|---|
| Column 8, lines 53, 54 | Page 19, line 16 |
| ...(ketone $B_1$)... | ...(ketone $B'_1$)... |
| Column 10, lines 4 - 14<br>Formula $B_5(B_2)$ | Page 22, lines 1 - 5<br>Formula $B_5(B_2)$ |
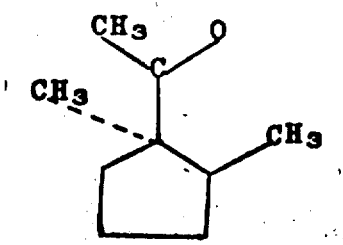
$B_5(B_2)$
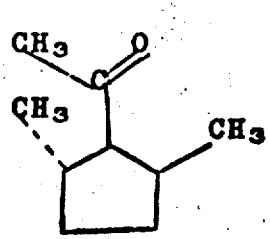
$B_5(B_2)$
| Column 14, line 3 | Page 30 line 1 |
|---|---|
| ...municating channels above and below the intermedi-... | .............. |
| Column 16, lines 46 - 64 | Page 36, lines 10 - 15 |
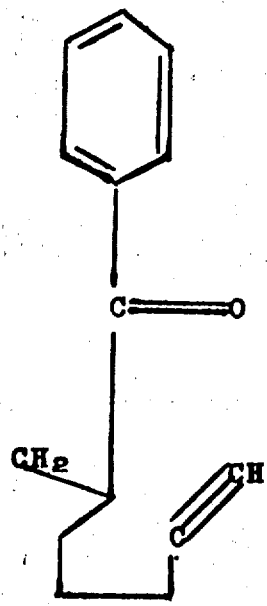
$A_{21}$
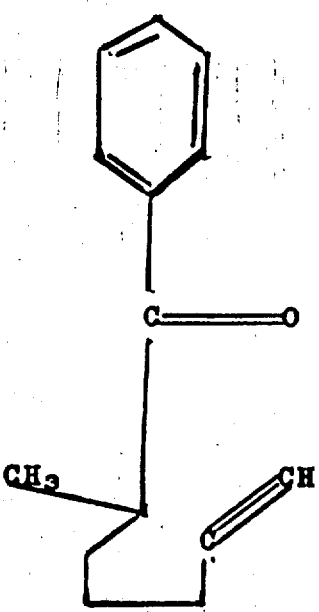
$A_{21}$

Patent No. 3,531,504 reads:
Column 17, lines 10 - 35
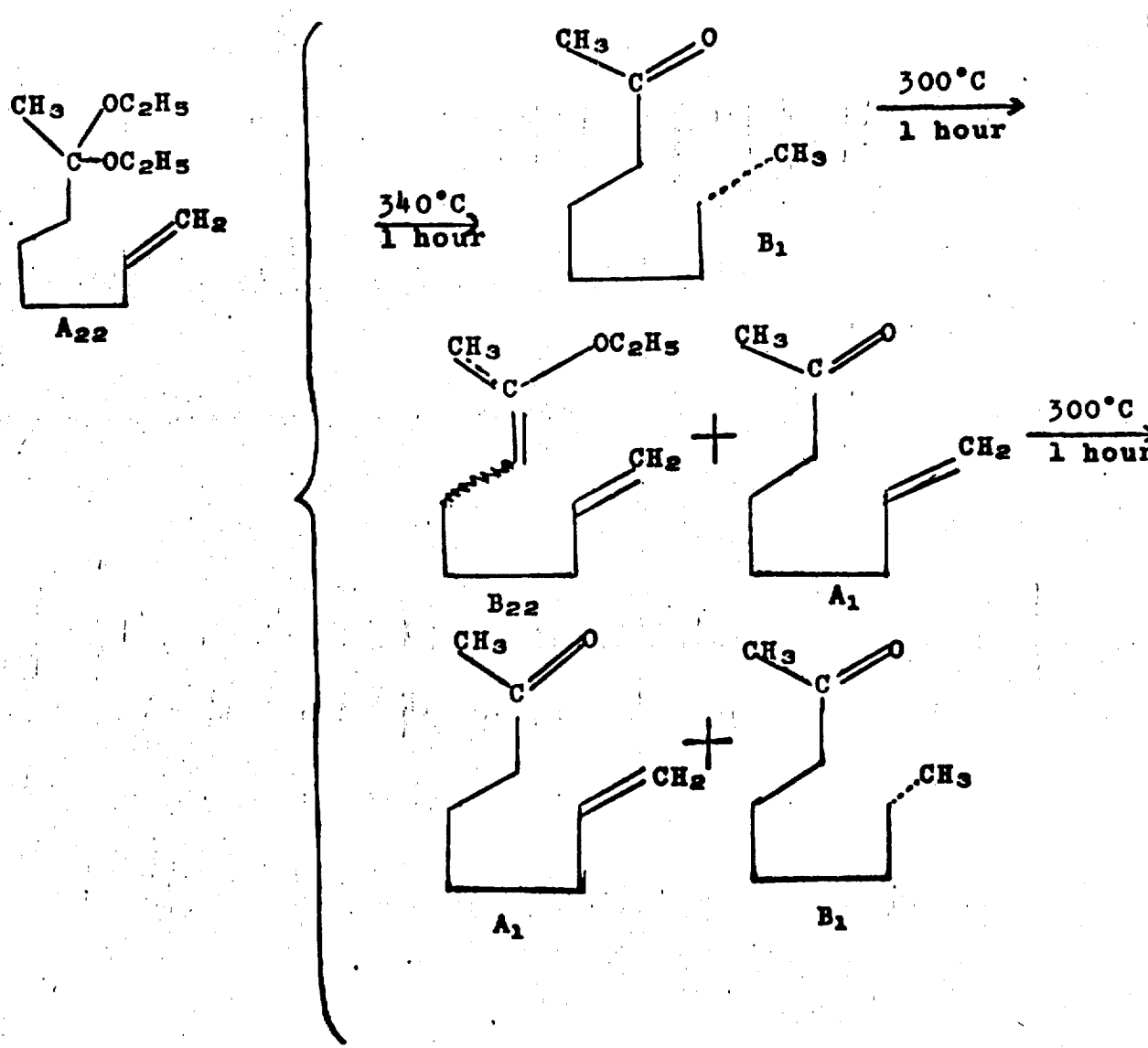

Patent should read as correctly appears in Application S.N. 642,352
Page 37, lines 5 - 22
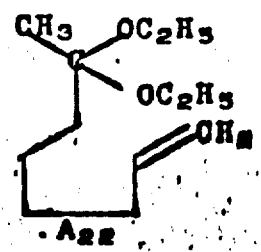
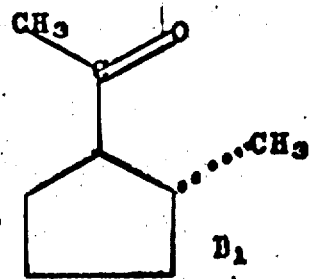
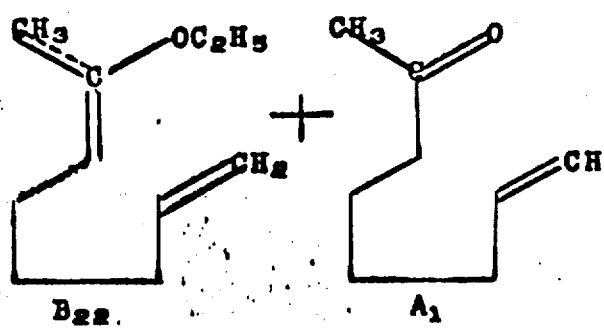
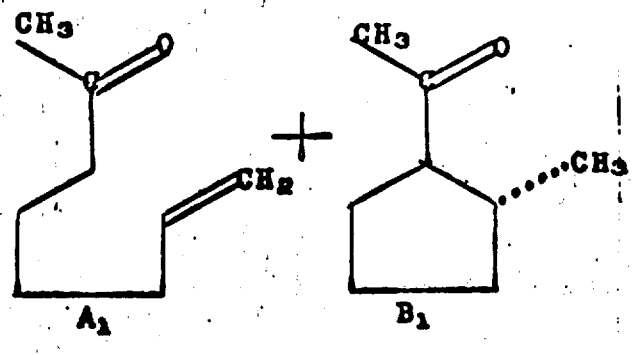

Patent No. 3,531,504 reads:
Column 18, lines 3 - 20
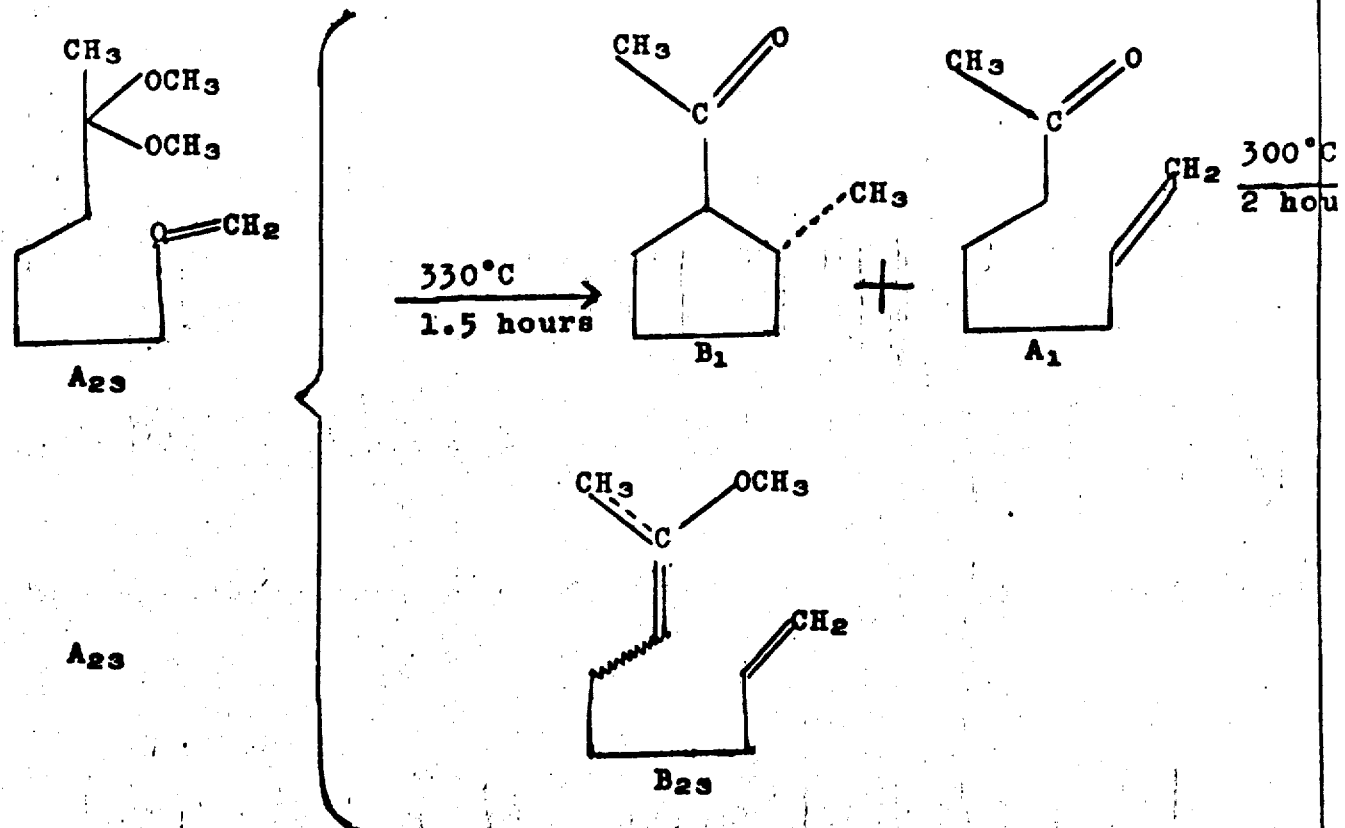

Patent should read as correctly appears in Application S.N. 642,352
Page 39, lines 5 - 15
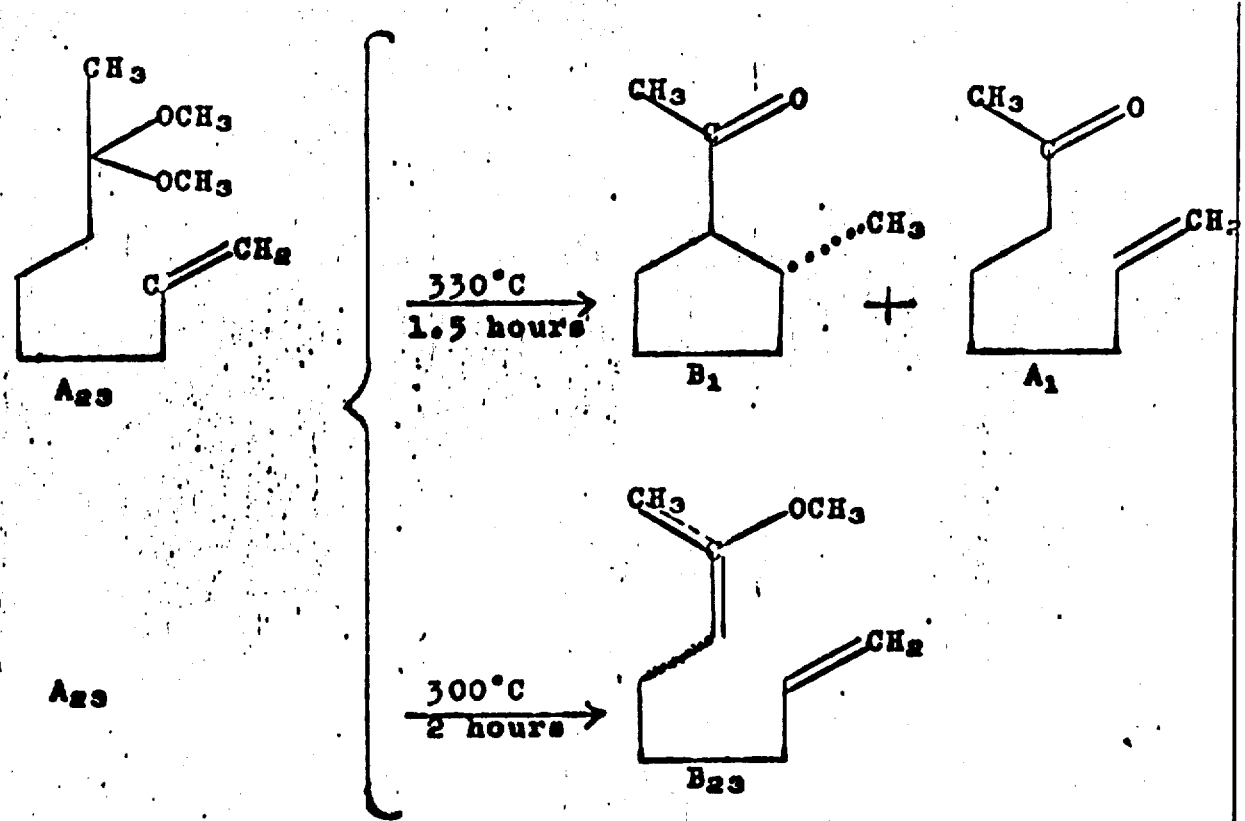

Patent No. 3,531,504 reads:
Cclumn 18, lines 50 - 65
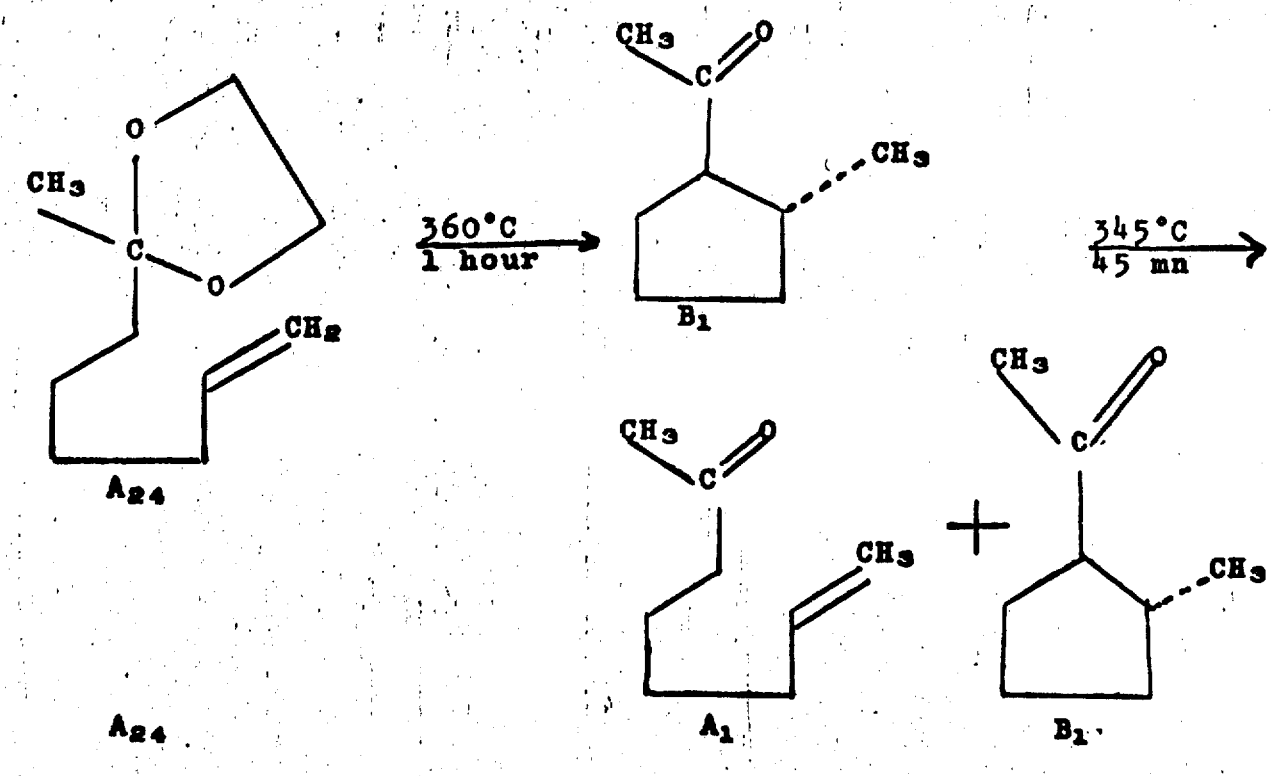

Patent should read as correctly appears in Application S.N. 642,352
Page 41, lines 5 - 15
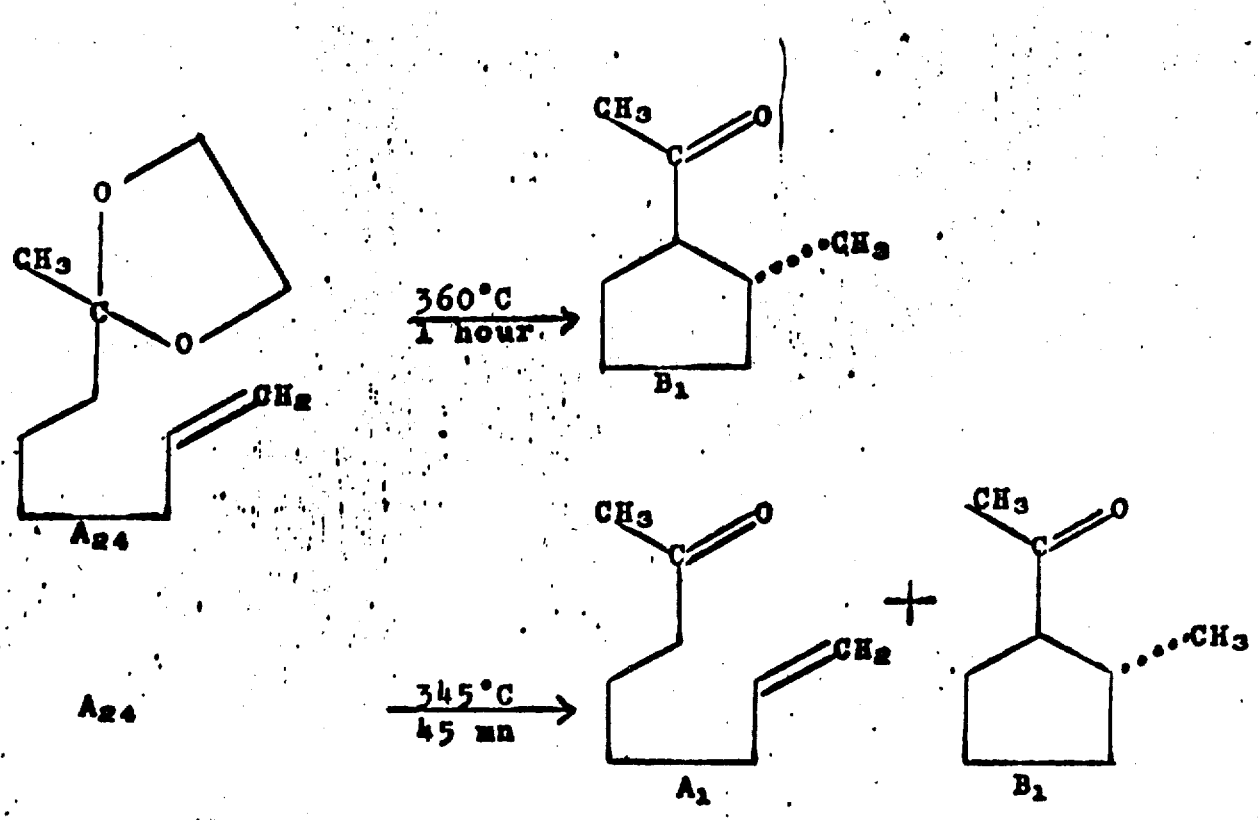

Patent No. 3,531,504 reads:
Column 20, lines 4 - 12
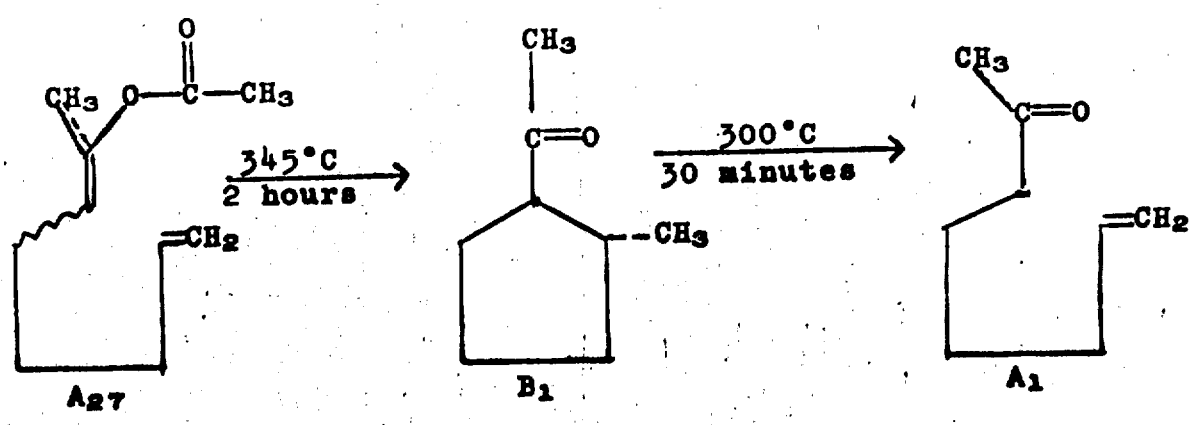

Patent should read as correctly appears in Application S.N. 642,352
Page 44, lines 4 - 15
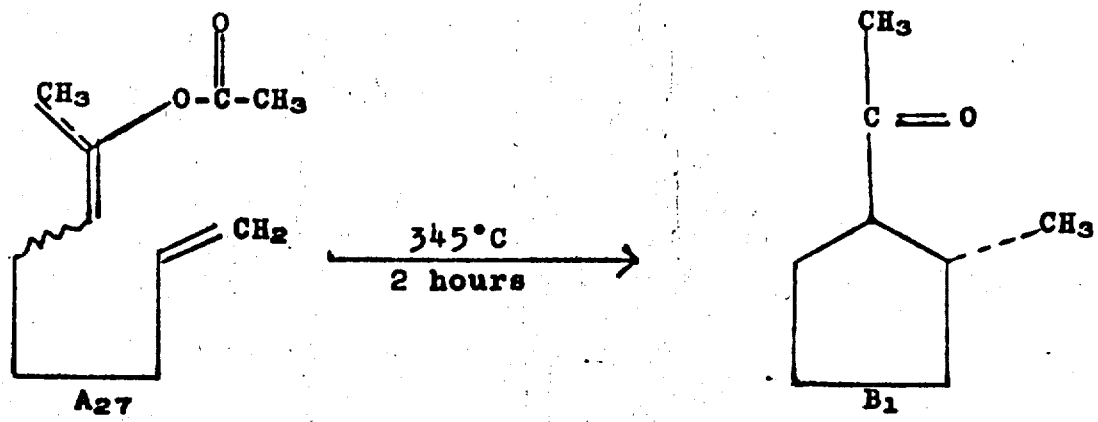
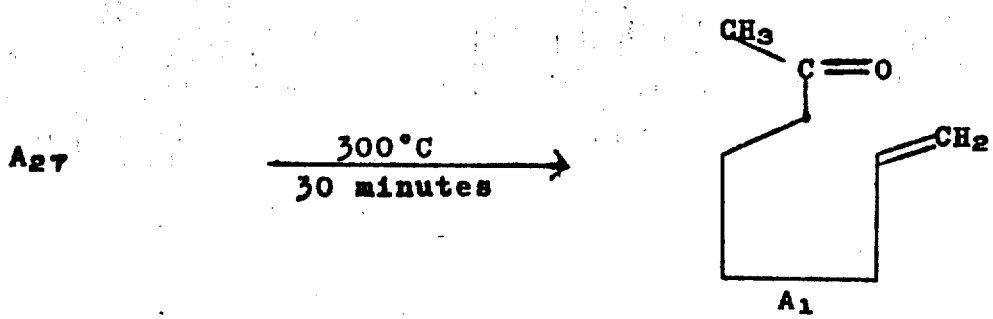
| Patent No. 3,531,504 reads: | Patent should read as correctly appears in Application S.N. 642,352 |
|---|---|
| Column 20, lines 41 - 48<br>Formula $B_{22}$ | Page 45, lines 10 - 15<br>Formula $B_{22}$ |
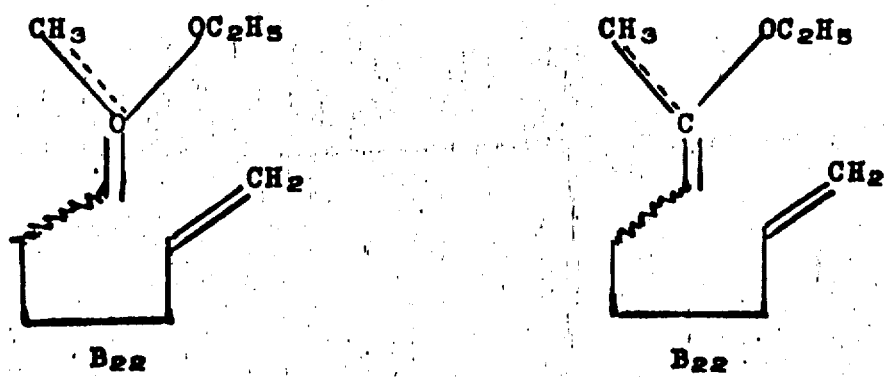

12

| Patent No. 3,531,504 reads: | Patent should read as correctly appears in Application S.N. 642,352 |

Column 21, lines 5 - 10:
Formula $A_{30}$

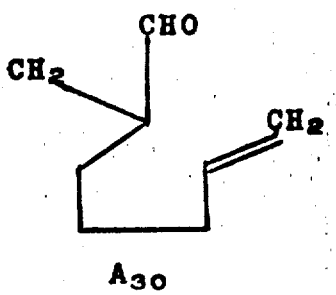

$A_{30}$

Page 46, lines 25 - 28:
Formula $A_{30}$

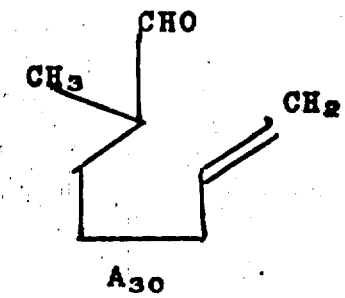

$A_{30}$

Column 23, lines 48 - 49:
Claim 5:

...thereby formed is
1-acetyl17,8-dimethyl-
bicyclo[3.2.1] octane...

Claim 6, lines 18 - 19:

...thereby formed is
1-acetyl-7,8-dimethyl-
bicyclo[3.2.1] octane...

Column 24, lines 53 - 55:
Claim 19:
...1-methyl-spiro[4.5]decan-6-one,
[3-methoxy-17-acetyl-1,3,5(10)estratriene],
3-methoxy-12-keto-17-methyl-1,3,5(10)-estratriene...

Claim 23:

...1-methyl-spiro[4.5]decan-6-one,
3-methoxy-12-keto-17-methyl-1,3,5(10)-estratriene...

Signed and sealed this 12th day of January 1971.

(SEAL)
Attest:

EDWARD M. FLETCHER, JR.
Attesting Officer

WILLIAM E. SCHUYLER, JR.
Commissioner of Patents